US012809067B2

(12) United States Patent
Derks et al.

(10) Patent No.: US 12,809,067 B2
(45) Date of Patent: Nov. 24, 2026

(54) FACETED MICROSTRUCTURED SURFACE

(71) Applicant: 3M INNOVATIVE PROPERTIES COMPANY, St. Paul, MN (US)

(72) Inventors: Kristopher J. Derks, Woodbury, MN (US); Tri D. Pham, Woodbury, MN (US); Kenneth A. Epstein, St. Paul, MN (US); David J. Lamb, Oakdale, MN (US)

(73) Assignee: 3M Innovative Properties Company, St. Paul, MN (US)

(*) Notice: Subject to any disclaimer, the term of this patent is extended or adjusted under 35 U.S.C. 154(b) by 195 days.

(21) Appl. No.: 18/931,483

(22) Filed: Oct. 30, 2024

(65) Prior Publication Data

US 2025/0155613 A1 May 15, 2025

Related U.S. Application Data

(63) Continuation of application No. 16/467,221, filed as application No. PCT/IB2018/050104 on Jan. 8, 2018, now Pat. No. 12,164,120.

(Continued)

(51) Int. Cl.
*G02B 5/02* (2006.01)

(52) U.S. Cl.
CPC ......... *G02B 5/0221* (2013.01); *G02B 5/0231* (2013.01); *G02B 5/0278* (2013.01); *Y10T 428/24355* (2015.01)

(58) Field of Classification Search
CPC .. G02B 5/0221; G02B 5/0231; G02B 5/0278; G02B 5/045; G02B 5/0268; G02B 5/04; Y10T 428/24355

(Continued)

(56) References Cited

U.S. PATENT DOCUMENTS

| | | | |
|---|---|---|---|
| 5,175,030 | A | 12/1992 | Lu et al. |
| 5,486,949 | A | 1/1996 | Schrenk et al. |

(Continued)

FOREIGN PATENT DOCUMENTS

| | | | |
|---|---|---|---|
| CN | 101196586 | A | 6/2008 |
| JP | H08211230 | A | 8/1996 |

(Continued)

OTHER PUBLICATIONS

International Search Report for PCT International Application No. PCT/IB2018/050104, mailed on Apr. 16, 2018, 5 pages.

*Primary Examiner* — William R Alexander
(74) *Attorney, Agent, or Firm* — Christopher P. Tebow; Robert S. Moshrefzadeh

(57) ABSTRACT

An optical film includes a microstructured surface comprising a plurality of prismatic structures, the microstructured surface defining a reference plane and a thickness direction perpendicular to the reference plane; wherein the plurality of prismatic structures includes a plurality of facets, each facet having a facet normal direction forming a polar angle with respect to the thickness direction and an azimuthal angle along the reference plane, and wherein the microstructured surface has a surface azimuthal distribution of the plurality of facets that is substantially uniform, and wherein the microstructured surface has a surface polar distribution of the plurality of facets that has an off-axis peak polar distribution.

5 Claims, 32 Drawing Sheets

Related U.S. Application Data

(60) Provisional application No. 62/446,821, filed on Jan. 16, 2017.

(58) Field of Classification Search
USPC .......................................................... 359/599
See application file for complete search history.

(56) References Cited

U.S. PATENT DOCUMENTS

| | | | | |
|---|---|---|---|---|
| 5,612,820 | A | 3/1997 | Schrenk et al. | |
| 5,783,120 | A | 7/1998 | Ouderkirk et al. | |
| 7,330,315 | B2 * | 2/2008 | Nilsen | G02B 5/045 362/337 |
| 12,164,120 | B2 * | 12/2024 | Derks | G02B 5/045 |
| 2004/0246599 | A1 * | 12/2004 | Nilsen | G02B 6/0053 359/831 |
| 2005/0280752 | A1 | 12/2005 | Kim et al. | |
| 2007/0010594 | A1 * | 1/2007 | Wang | G02B 5/0221 522/182 |
| 2008/0225394 | A1 | 9/2008 | Lin et al. | |
| 2009/0256997 | A1 | 10/2009 | Misono et al. | |
| 2010/0302479 | A1 | 12/2010 | Aronson et al. | |
| 2012/0147593 | A1 | 6/2012 | Yapel et al. | |
| 2012/0176772 | A1 | 7/2012 | Maekawa et al. | |
| 2014/0071549 | A1 | 3/2014 | Yang et al. | |
| 2014/0126065 | A1 * | 5/2014 | Wang | G02B 5/0221 359/625 |
| 2015/0029748 | A1 | 1/2015 | Yokota et al. | |
| 2015/0116833 | A1 | 4/2015 | Boyd et al. | |
| 2015/0293272 | A1 | 10/2015 | Pham et al. | |
| 2015/0346421 | A1 * | 12/2015 | Wang | G02B 27/1073 362/330 |
| 2016/0146982 | A1 | 5/2016 | Boyd et al. | |
| 2016/0231498 | A1 * | 8/2016 | Wang | G02B 5/045 |
| 2016/0266285 | A1 * | 9/2016 | Wang | G02B 6/0053 |
| 2018/0217300 | A1 * | 8/2018 | Boyd | G02B 3/005 |
| 2018/0299095 | A1 * | 10/2018 | Reutter | F21V 5/005 |
| 2020/0142104 | A1 * | 5/2020 | Rosen | G02B 5/0231 |

FOREIGN PATENT DOCUMENTS

| | | | |
|---|---|---|---|
| JP | 2006011439 | A | 1/2006 |
| JP | 2008544303 | A | 12/2008 |
| JP | 2009265498 | A | 11/2009 |
| JP | 2012103495 | A | 5/2012 |
| JP | 2012237978 | A | 12/2012 |
| JP | 2013218092 | A | 10/2013 |
| JP | 2016001306 | A | 1/2016 |
| WO | 2006133458 | A2 | 12/2006 |
| WO | 2008069324 | A1 | 6/2008 |
| WO | 2009079275 | A1 | 6/2009 |
| WO | 2010005051 | A1 | 1/2010 |
| WO | 2010059568 | A1 | 5/2010 |
| WO | 2013158475 | A1 | 10/2013 |

* cited by examiner

| Type of Structure (0= Ellipsoid; 1=Cone) | Structure Index | Plane Surface Type | Plane Surface Roughness Fraction | Plane Roughness Angle Distribution Width | Protrusion Surface Fraction f | Ellipsoid Height/ Max Height H/a | Protrusion Aspect Ratio a/b | Protrusion Height Fraction h/H | Unit Cell & Method | Maximum Cell Diameter D0 | Structure Surface Type | Structure Surface Roughness Fraction | Structure Angle Distribution Width (Along X) | Structure Angle Distribution Width (Along Y) | Cone Gain |
|---|---|---|---|---|---|---|---|---|---|---|---|---|---|---|---|
| 0,1 | 0 | 0 | 0-1 | (deg) | 0-1 | 0 | 0 | 0-1 | 0 - 3 | (um) | 0 | 0 - 1 | (deg) | (deg) | |
| 1 | 1.58 | 1 | 1 | 50 | 1 | 1 | 1.3 | 1 | 2 | 10 | 1 | 1 | 12.5 | 12.5 | 1.404 |
| 1 | 1.58 | 1 | 1 | 50 | 1 | 1 | 1.35 | 1 | 2 | 10 | 1 | 1 | 12.5 | 12.5 | 1.405 |
| 1 | 1.58 | 1 | 1 | 50 | 1 | 1 | 1.4 | 1 | 2 | 10 | 1 | 1 | 12.5 | 12.5 | 1.410 |
| 1 | 1.58 | 1 | 1 | 50 | 1 | 1 | 1.45 | 1 | 2 | 10 | 1 | 1 | 12.5 | 12.5 | 1.402 |
| 1 | 1.58 | 1 | 1 | 50 | 1 | 1 | 1.5 | 1 | 2 | 10 | 1 | 1 | 12.5 | 12.5 | 1.402 |
| 1 | 1.58 | 1 | 1 | 50 | 1 | 1 | 1.55 | 1 | 2 | 10 | 1 | 1 | 12.5 | 12.5 | 1.397 |
| 1 | 1.58 | 1 | 1 | 50 | 1 | 1 | 1.6 | 1 | 2 | 10 | 1 | 1 | 12.5 | 12.5 | 1.400 |
| 1 | 1.58 | 1 | 1 | 50 | 1 | 1 | 1.65 | 1 | 2 | 10 | 1 | 1 | 12.5 | 12.5 | 1.387 |
| 1 | 1.58 | 1 | 1 | 50 | 1 | 1 | 1.7 | 1 | 2 | 10 | 1 | 1 | 12.5 | 12.5 | 1.381 |
| 1 | 1.58 | 1 | 1 | 50 | 1 | 1 | 1.75 | 1 | 2 | 10 | 1 | 1 | 12.5 | 12.5 | 1.376 |
| 1 | 1.58 | 1 | 1 | 50 | 1 | 1 | 1.8 | 1 | 2 | 10 | 1 | 1 | 12.5 | 12.5 | 1.375 |
| 1 | 1.58 | 1 | 1 | 50 | 1 | 1 | 1.85 | 1 | 2 | 10 | 1 | 1 | 12.5 | 12.5 | 1.368 |
| 1 | 1.58 | 1 | 1 | 50 | 1 | 1 | 1.5 | 1 | 2 | 10 | 1 | 1 | 12.5 | 12.5 | 1.398 |

FIG. 13

| Type of Structure (0= Ellipsoid; 1=Cone) | Structure Index | Plane Surface Type | Plane Surface Roughness Fraction | Plane Roughness Angle Distribution Width | Protrusion Surface Fraction f | Ellipsoid Height/ Max Height H/a | Protrusion Aspect Ratio a/b | Protrusion Height Fraction h/H | Unit Cell & Method | Maximum Cell Diameter D0 | Structure Surface Type | Structure Surface Roughness Fraction | Structure Angle Distribution Width (Along X) | Structure Angle Distribution Width (Along Y) | Cone Gain |
|---|---|---|---|---|---|---|---|---|---|---|---|---|---|---|---|
| 0,1 | 0 | 0 | 0-1 | (deg) | 0-1 | 0 | 0 | 0 - 1 | 0 - 3 | (um) | 0 | 0 - 1 | (deg) | (deg) | |
| 1 | 1.58 | 1 | 1 | 50 | 0.98 | 1 | 1.5 | 1 | 2 | 10 | 1 | 1 | 12.5 | 12.5 | 1.395 |
| 1 | 1.58 | 1 | 1 | 50 | 0.96 | 1 | 1.5 | 1 | 2 | 10 | 1 | 1 | 12.5 | 12.5 | 1.384 |
| 1 | 1.58 | 1 | 1 | 50 | 0.94 | 1 | 1.5 | 1 | 2 | 10 | 1 | 1 | 12.5 | 12.5 | 1.385 |
| 1 | 1.58 | 1 | 1 | 50 | 1 | 1 | 1.55 | 1 | 2 | 10 | 1 | 1 | 12.5 | 12.5 | 1.392 |
| 1 | 1.58 | 1 | 1 | 50 | 0.98 | 1 | 1.55 | 1 | 2 | 10 | 1 | 1 | 12.5 | 12.5 | 1.392 |
| 1 | 1.58 | 1 | 1 | 50 | 0.96 | 1 | 1.55 | 1 | 2 | 10 | 1 | 1 | 12.5 | 12.5 | 1.384 |
| 1 | 1.58 | 1 | 1 | 50 | 0.94 | 1 | 1.55 | 1 | 2 | 10 | 1 | 1 | 12.5 | 12.5 | 1.371 |
| 1 | 1.58 | 1 | 1 | 50 | 0.94 | 1 | 1.55 | 1 | 2 | 10 | 1 | 1 | 12.5 | 12.5 | 1.379 |
| 1 | 1.58 | 1 | 1 | 50 | 0.92 | 1 | 1.55 | 1 | 2 | 10 | 1 | 1 | 12.5 | 12.5 | 1.369 |
| 1 | 1.58 | 1 | 1 | 50 | 0.9 | 1 | 1.55 | 1 | 2 | 10 | 1 | 1 | 12.5 | 12.5 | 1.368 |
| 1 | 1.56 | 1 | 1 | 50 | 1 | 1 | 1.55 | 1 | 2 | 10 | 1 | 1 | 11.5 | 11.5 | 1.391 |
| 1 | 1.56 | 1 | 1 | 50 | 0.96 | 1 | 1.55 | 1 | 2 | 10 | 1 | 1 | 11.5 | 11.5 | 1.382 |
| 1 | 1.56 | 1 | 1 | 50 | 0.96 | 1 | 1.55 | 1 | 2 | 10 | 1 | 1 | 11.5 | 11.5 | 1.379 |
| 1 | 1.56 | 1 | 1 | 50 | 0.94 | 1 | 1.55 | 1 | 2 | 10 | 1 | 1 | 11.5 | 11.5 | 1.375 |

FIG. 13 (Continued)

FACETED MICROSTRUCTURED SURFACE

BACKGROUND

Display systems, such as liquid crystal display (LCD) systems, are used in a variety of applications and commercially available devices such as, for example, computer monitors, personal digital assistants (PDAs), mobile phones, miniature music players, and thin LCD televisions. Many LCDs include a liquid crystal panel and an extended area light source, often referred to as a backlight, for illuminating the liquid crystal panel. Backlights typically include one or more lamps and a number of light management films such as, for example, light guides, mirror films, light redirecting films (including brightness enhancement films), retarder films, light polarizing films, and diffusing films. Diffusing films are typically included to hide optical defects and improve the brightness uniformity of the light emitted by the backlight. Diffusing films can also be used in applications other than display systems.

SUMMARY

According to embodiments of the disclosure, an optical article may include an optical film having a microstructured surface with randomly-distributed prismatic structures across a reference plane. The irregular prismatic structures may include flat facets at a polar angle from the reference plane and an azimuthal angle along the reference plane. The prismatic structures may be distributed and oriented so that collimated light optical transmission properties of the microstructured surface approximate collimated light optical transmission properties of aggregate conical prismatic structures.

In another embodiment, an optical film may include a microstructured surface comprising a plurality of prismatic structures, the microstructured surface defining a reference plane and a thickness direction perpendicular to the reference plane; wherein the plurality of prismatic structures includes a plurality of facets, each facet having a facet normal direction forming a polar angle with respect to the thickness direction and an azimuthal angle along the reference plane, and wherein the microstructured surface has a surface azimuthal distribution of the plurality of facets that is substantially uniform, and wherein the microstructured surface has a surface polar distribution of the plurality of facets that has an off-axis peak polar distribution.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the drawings indicate like elements. Dotted lines indicate optional or functional components, while dashed lines indicate components out of view.

FIG. 13 is a table of modeled cone gain versus various cone structural parameters.

FIG. 37 is a micrograph of an example optical film as described herein.

DETAILED DESCRIPTION

Microstructured films may include microstructures with angled sides to collimate light by refracting light at particular incidence angles and reflecting light at other incidence angles back into the film to undergo further processing. To promote consistent brightness across the surface of the microstructured film, the microstructures may be patterned with surfaces oriented at a variety of angles. In some instances, the microstructures may be elongated prismatic microstructures that have flat sides angled in opposing directions. For example, two films of elongated prismatic microstructures may be stacked at perpendicular angles to collimate light along a single axis each. The surface of films having these microstructures may be covered by angled sides. However, the patterned structure of these films may not spatially distribute light evenly across the entire surface due to a limited azimuthal distribution of side angles. In other instances, microstructures may have circular or oval base profiles that have radial surfaces that distribute light in all directions. For example, microstructures may be spherical lenses or cones. However, the circular profiles of these circular base microstructures may not substantially cover the surface of films using these microstructures, leaving flat or unstructured areas in between the circular base microstructures. Further, microstructured films with a regular pattern of microstructures may be subject to negative effects, such as a moiré effect.

The present disclosure includes an optical film having a microstructured surface for collimating light. The microstructured surface includes an irregular distribution of a plurality of prismatic structures that include a plurality of facets angled from a reference plane of the microstructured surface. While the prismatic structures may be individually irregular or random, the facets of the prismatic structures may be sized, angled, and distributed such that the surface azimuthal distribution of facets may be substantially uniform along the reference plane, while the surface polar distribution of facets may fall substantially within a polar range that correlates with a peak transmission of light normally incident to the reference plane. This distribution of facets may result in optical distribution properties of the microstructured surface that approximate conical optical distribution properties, such as the optical distribution properties of an ensemble of conical prismatic structures having an equivalent distribution of base angles, while covering substantially the entire major surface with prismatic structures. The use of interconnected facet surfaces may enable substantially the entire surface of the optical film to be covered by the microstructured surface. The irregular distribution of the prismatic structures may reduce moiré effects that appear in patterned or regular films.

Figure 1:
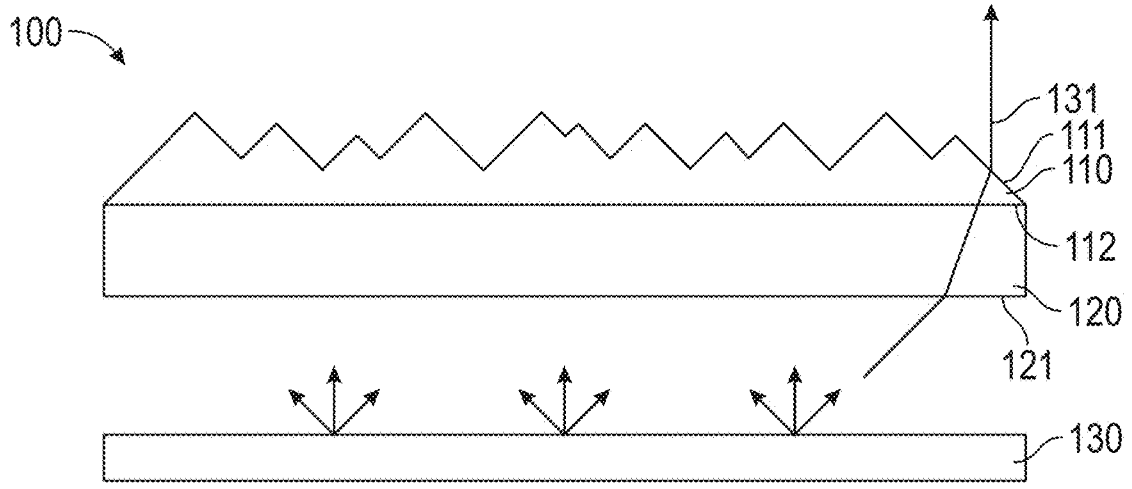
FIG. 1 is a diagram of an optical article that includes an optical film on a substrate.

FIG. 1 is a diagram of an optical article 100 that includes an optical film 110 on a substrate 120. Optical film 110 includes a microstructured surface 111 and a flat major surface 112 coupled to substrate 120. Substrate 120 includes a bottom major surface 121. Light 131 produced by a light source 130 may refract at bottom major surface 121 through substrate 120 and exit at microstructured surface 111. Light 131 exiting from optical article 100 may be substantially collimated (i.e. exit microstructured surface 111 in a direction that is substantially perpendicular to bottom major surface 121).

Microstructured surface 111 may be structured to produce substantially collimated light from uncollimated light produced by light source 130 and processed through optical article 100. Factors affecting collimation of light at microstructured surface 111 may include, for example, a refractive index of optical film 110, a refractive index of media contacting microstructured surface 111, and an angle of incident light on microstructured surface 111. Factors affecting the angle of incident light on microstructured surface 111 may include, for example, a refractive index of substrate 120, a refractive index of media between bottom major surface 121 of substrate 120 and light source 130, and an angle of incident light emitted from light source 130.

In some examples, optical article 100 may polarize and collimate light from light source 130. As may be described in further detail below, optical film 110 may be a collimating film and substrate 120 may be a reflective polarizer. By combining a collimating optical film described herein with a reflective polarizer, an optical article may operate to increase collimation and brightness in a single backlight film.

Figure 2A:
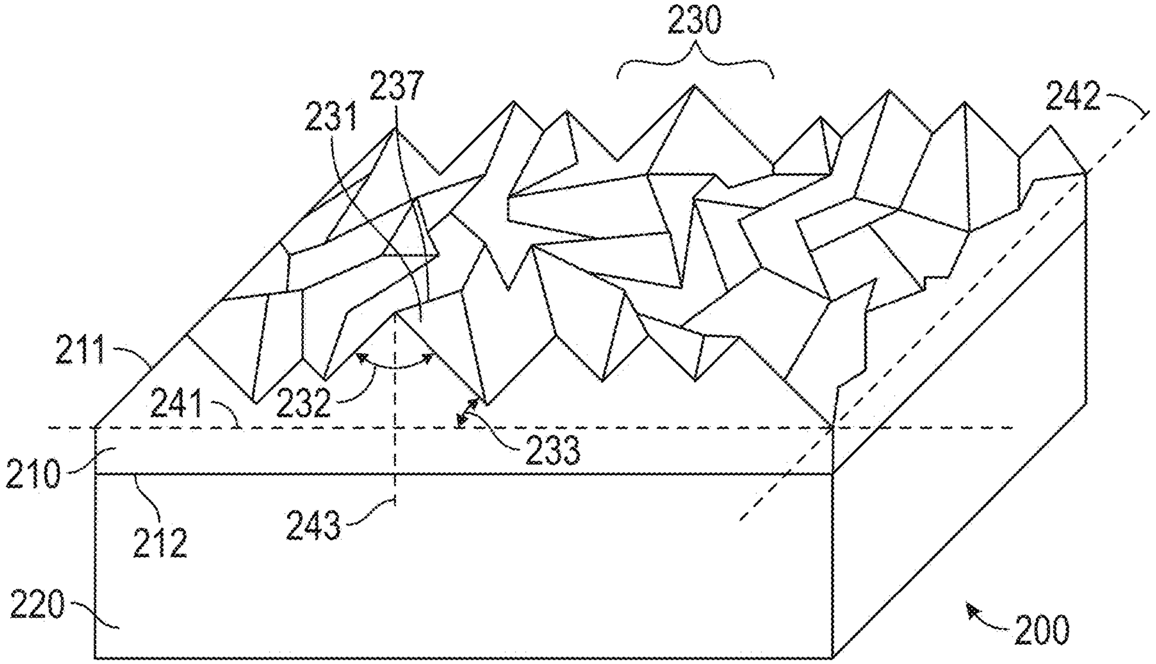
FIG. 2A is a diagram of an optical article that includes an optical film having a microstructured surface.

FIG. 2A is a diagram of an optical article 200, such as optical article 100 described above, that includes an optical film 210 having a microstructured surface 211. Optical article 200 may be used in optical devices which further comprise a light source, such as light source 130, and a light gating device, such as a liquid crystal display device. The optical articles 200 may be used to direct light from the light source to the light gating device. Examples of light sources include electroluminescent panels, light guide assemblies, and fluorescent or LED backlights. The light source may produce uncollimated light. Optical articles 200 may be used as brightness enhancement films, uniformity films, turning films, or image directing films (refracting beam redirecting product) depending upon the configuration of microstructured surface 211. An optical system using optical article 200 may be an optical display, backlight, or similar system, and may include other components such as a liquid crystal panel and additional polarizers, and/or other optical films or components.

Optical film 210 may be attached to a substrate 220 at a flat major surface 212. In this embodiment, optical article 200 includes two layers: substrate 220 and optical film 210. However, optical film 210 may have one or more layers. For example, in some cases, optical article 200 can have only a single layer of optical film 210 that includes microstructured surface 211 and bottom major surface 212. In some cases, optical article 200 can have many layers. For example, substrate 220 may be composed of multiple distinct layers. When optical article 200 includes multiple layers, the constituent layers may be coextensive with each other, and each pair of adjacent constituent layers may comprise tangible optical materials and have major surfaces that are completely coincident with each other, or that physically contact each other at least over 80%, or at least 90%, of their respective surface areas.

Substrate 220 may have a composition suitable for use in an optical product designed to control the flow of light. Factors and properties for use as a substrate material may include sufficient optical clarity and structural strength so that, for example, substrate 220 may be assembled into or used within a particular optical product, and may have sufficient resistance to temperature and aging such that performance of the optical product is not compromised over time. The particular chemical composition and thickness of substrate 220 for any optical product may depend on the requirements of the particular optical product that is being constructed, e.g., balancing the needs for strength, clarity, temperature resistance, surface energy, adherence to the microstructured surface, ability to form a microstructured surface, among others. Substrate 220 may be uniaxially or biaxially oriented.

Useful substrate materials for substrate 220 may include, but are not limited to, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polycyclo-olefins, polyimides, and glass. Optionally, the substrate material can contain mixtures or combinations of these materials. In an embodiment, substrate 220 may be multi-layered or may contain a dispersed phase suspended or dispersed in a continuous phase. For some optical products, such as brightness enhancement films, examples of desirable substrate materials may include, but are not limited to, polyethylene terephthalate (PET) and polycarbonate.

Some substrate materials can be optically active and act as polarizing materials. Polarization of light through a film may be accomplished, for example, by the inclusion of dichroic polarizers in a film material that selectively absorbs passing light, or by the inclusion of reflective polarizers in a film material that selectively reflects passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film may be aligned into a polarizing orientation, for example, by employing methods such as stretching the film, applying electric or magnetic fields, and coating techniques.

Examples of polarizing films include those described in U.S. Pat. Nos. 5,825,543 and 5,783,120, each of which are incorporated herein by reference. The use of these polarizer films in combination with a brightness enhancement film has been described in U.S. Pat. No. 6,111,696, incorporated by reference herein. A second example of a polarizing film that can be used as a substrate are those films described in U.S. Pat. No. 5,882,774, also incorporated herein by reference. Films available commercially are the multilayer films sold under the trade designation DBEF (Dual Brightness Enhancement Film) from 3M. The use of such multilayer polarizing optical film in a brightness enhancement film has been described in U.S. Pat. No. 5,828,488, incorporated herein by reference. This list of substrate materials is not exclusive, and as will be appreciated by those of skill in the art, other polarizing and non-polarizing films can also be useful as the base for the optical products of the invention. These substrate materials can be combined with any number of other films including, for example, polarizing films to form multilayer structures. A short list of additional substrate materials can include those films described in U.S. Pat. Nos. 5,612,820 and 5,486,949, among others. The thickness of a particular base can also depend on the above-described requirements of the optical product.

In some examples, optical article 200 may be a free floating or backlight film, and substrate 220 may be a reflective polarizer. Optical film 210 may be attached to substrate 220 at bottom major surface 212, with microstructured surface 211 facing a display component, such as a liquid crystal display. With respect to a path of light travelling through a system using optical article 200, optical film 210 may be located "above" substrate 220 in a film stack of the system. Optical article 200 having a reflective polarizer and collimating optical film may offer both collimating and brightness increasing properties in the same film.

Optical film 210 may directly contact substrate 220 at bottom major surface 212 or be optically aligned to substrate 220, and can be of a size, shape, and thickness that allows microstructured surface 211 to direct or concentrate the flow of light. Optical film 210 may be integrally formed with substrate 220 or can be formed from a material and adhered or laminated to substrate 220.

Optical film 210 may have any suitable index of refraction. Factors for selection of an index of refraction may include, but are not limited to, the direction of incoming light into optical film 210, surface properties of microstructured surface 211, and desired direction of outgoing light from microstructured surface 211. For example, in some cases, optical film 210 may have an index of refraction in a range from about 1.4 to about 1.8, or from about 1.5 to about 1.8, or from about 1.5 to about 1.7. In some cases, optical film 210 may have an index of refraction that is not less than about 1.5, or not less than about 1.55, or not less than about 1.6, or not less than about 1.65, or not less than about 1.7.

Optical film 210 may have a composition suitable for use in an optical product designed to control the flow of light. Materials useful for optical film 10 include, but are not limited to: poly(carbonate) (PC); syndiotactic and isotactic poly(styrene) (PS); C1-C8 alkyl styrenes; alkyl, aromatic, and aliphatic ring-containing (meth)acrylates, including poly(methylmethacrylate) (PMMA) and PMMA copolymers; ethoxylated and propoxylated (meth)acrylates; multifunctional (meth)acrylates; acrylated epoxies; epoxies; and other ethylenically unsaturated materials; cyclic olefins and cyclic olefinic copolymers; acrylonitrile butadiene styrene (ABS); styrene acrylonitrile copolymers (SAN); epoxies; poly(vinylcyclohexane); PMMA/poly(vinylfluoride) blends; poly(phenylene oxide) alloys; styrenic block copolymers; polyimide; polysulfone; poly(vinyl chloride); poly (dimethyl siloxane) (PDMS); polyurethanes; unsaturated polyesters; poly(ethylene), including low birefringence polyethylene; poly(propylene) (PP); poly(alkane terephthalates), such as poly(ethylene terephthalate) (PET); poly (alkane napthalates), such as poly(ethylene naphthalate) (PEN); polyamide; ionomers; vinyl acetate/polyethylene copolymers; cellulose acetate; cellulose acetate butyrate; fluoropolymers; poly(styrene)-poly(ethylene) copolymers; PET and PEN copolymers, including polyolefinic PET and PEN; and poly(carbonate)/aliphatic PET blends.

Figure 4:
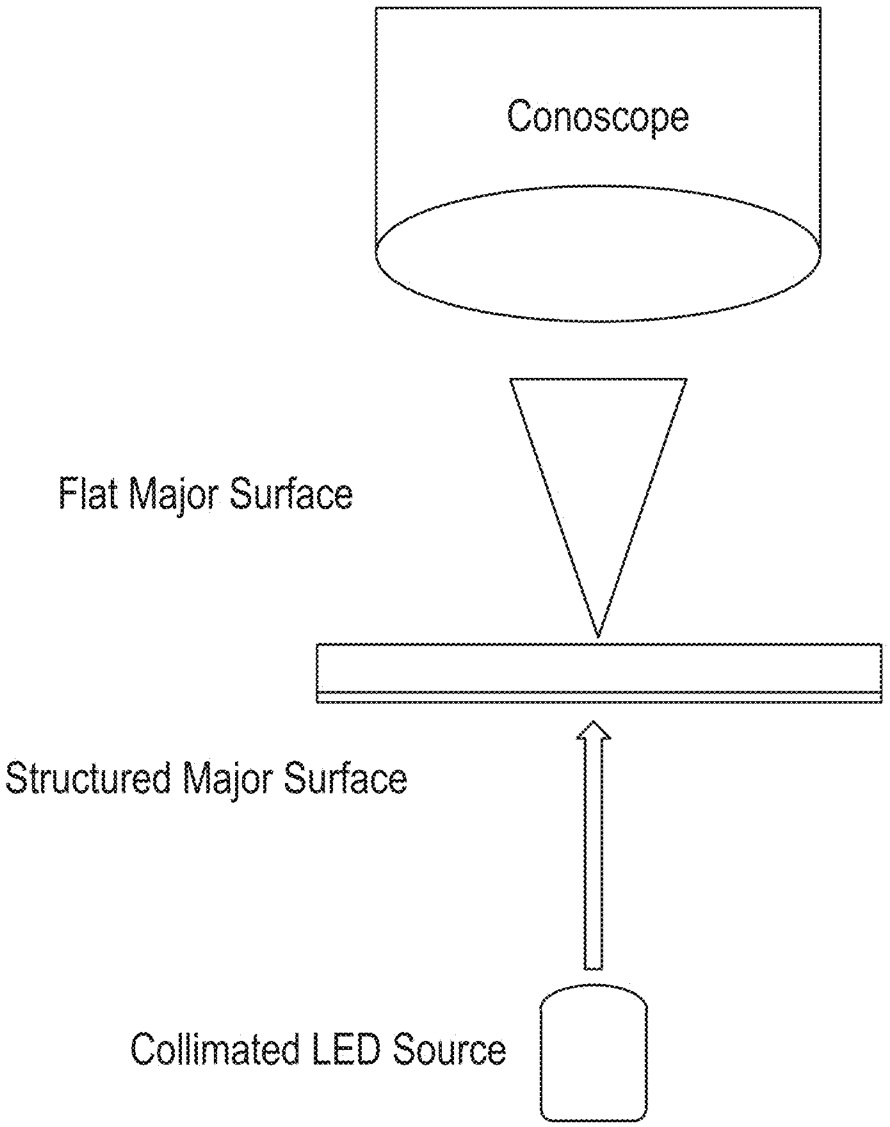
FIG. 4 is an exemplary method for generating light transmission information for an optical film through collimated light transmission.

Optical film 210 may include microstructured surface 211. Microstructured surface 211 may represent a structured surface for transmission of substantially collimated light from optical article 200. Microstructured surface 211 may be configured to refract light that contacts microstructured surface 211 at particular range(s) of incidence angles and reflect light outside these range(s). These range(s) may be dependent on, for example, the refractive indices of optical film 210 and any material contacting microstructured surface 211, such as air. FIG. 4 is an SEM image of an example optical film, such as optical film 210, having a microstructured surface, such as microstructured surface 211. For reference purposes, microstructured surface 211 may define a reference plane having an x-axis 241 and a y-axis 242 perpendicular to x-axis 241, and may define a thickness direction along a z-axis 243 perpendicular to the reference plane.

Microstructured surface 211 may include a plurality of prismatic structures 230. Prismatic structures 230 may represent configurations of microstructured surface 211 that characterize the desired function of optical film 210 having prismatic structures 230, such as collimating light. In general, prismatic structures 230 are capable of redirecting light by, for example, refracting a portion of incident light and recycling a different portion of the incident light. Prismatic structures 230 may be designed to redirect light that is incident on facets 231 of prismatic structures 230, along a desired direction, such as along the positive z-direction. In some examples, prismatic structures 230 may redirect light in a direction substantially parallel to z-axis 243 and normal to a reference plane formed by x-axis and y-axis. Prismatic structures 230 may cover substantially all microstructured surface 211 of optical film 210, such as greater than 90% of a surface area of microstructured surface 211.

Prismatic structures 230 of microstructured surface 211 may be substantially irregularly or randomly arranged across microstructured surface 211. A substantially irregular or random arrangement may include a spatial distribution of prismatic structures 230 across microstructured surface 211 that is locally unpatterned or irregularly patterned, but may exhibit particular properties, ranges of properties, or probabilities of properties in the aggregate. For example, as the plurality of prismatic structures 230 increases, an average of properties of the plurality of prismatic structures 230 may exhibit less deviation; however, a first spatial area of prismatic structures 230 and a second spatial area of prismatic structures 230 may not have a similar distribution of properties.

Discontinuities, e.g., projections, in microstructured surface 211 of optical article 200 may deviate in profile from the average center line drawn through prismatic structures 230 such that the sum of the areas embraced by the surface profile above the center line is equal to the sum of the areas below the line, said line being essentially parallel to the nominal surface (bearing the microstructure) of the article. The heights of prismatic structures 230 may be about 0.2 to 100 micrometers, as measured by an optical or electron microscope, through a representative characteristic length of the surface, for example, 1-30 cm. Said average center line can be planar, concave, convex, aspheric or combinations thereof. Prismatic structures 230 may have a pitch defined as the furthest distance between two intersecting facets. The pitch of prismatic structures 230 may be not more than 250 micrometers and may vary from 0 (intersecting) to 250 micrometers. The pitch may be related to factors such as base angle 233 of facets 231 on prismatic structures 230 and height of prismatic structures 230. In some examples, height and pitch may be selected to reduce sparkle. Sparkle refers to an optical artifact that appears as a grainy texture (texture mura) that consists of small regions of bright and dark luminance in what appears to be a random pattern. The position of the bright and dark regions can vary as the viewing angle changes, making the texture especially evident and objectionable to a viewer. To minimize sparkle, prismatic structures 230 may have a height less than about 100 micrometers, and preferably less than 20-30 micrometers, may have very little periodicity, may not form microimages of the proximate structure, or any combination of these attributes.

The plurality of prismatic structures 230 may include a plurality of facets 231. Each prismatic structure 230 may include a plurality of facets 231 meeting at a peak 237. Each facet 231 may represent a surface of prismatic structure 230 and microstructured surface 211 that defines at least one slope relative to a reference plane formed by x-axis 241 and y-axis 242, each facet 231 and corresponding slope forming a non-zero base angle 233.

The at least one slope of the plurality of facets 231 may define a slope magnitude distribution and a slope magnitude cumulative distribution. The slope magnitude distribution may represent a normalized frequency of slope angles, such as base angle 233. The slope magnitude cumulative distribution may represent a cumulative normalized frequency of slope angles, such as base angle 233, for each degree over microstructured surface 211. The cumulative slope magnitude distribution may include a rate of change that represents a change in cumulative normalized frequency for a slope angle. See, for example, FIG. 4A. In some examples, a rate of change in the slope magnitude cumulative distribution for slopes less than about 10 degrees may be less than about 1% per degree, while a rate of change in the slope magnitude cumulative distribution for slopes less than about 30 degrees may be less than about 2% per degree. See, for example, FIG. 27A. In some examples, a rate of change in the slope magnitude cumulative distribution at 20% may be substantially less than a rate of change of in the slope magnitude cumulative distribution around 60 degrees. See, for example, FIG. 27D. In some examples, a rate of change in the slope magnitude cumulative distribution around 10 degrees may be less than about 0.5% per degree, while a rate of change in the slope magnitude cumulative distribution around 20 degrees may be less than about 1% per degree. See, for example, FIG. 27B.

Microstructured surface 211 may define a plurality of slopes relative to the reference plane. In some examples, about 10% of the microstructured surface has slopes less than about 10 degrees and about 15% of the microstructured surface has slopes greater than about 60 degrees. See, for example, FIG. 27A. In some examples, about 80% of the structured surface has slopes between about 30 degrees to about 60 degrees. See, for example, FIG. 27A.

Each facet 231 may have a surface area and a facet normal direction that represents an average surface direction of facet 231. A surface area of each facet 231 may represent an area through which light passing through optical film 210 may contact the facet and refract at lower incidence angles or reflect at higher incidence angles. In examples where facet 231 is curved, the facet normal direction may be a normal direction of an average degree of curvature, a tangent of curvature, a plane across peaks of the facet 231, or other functional surface that represents an averaged refractive surface of the facet 231.

Figure 27A:
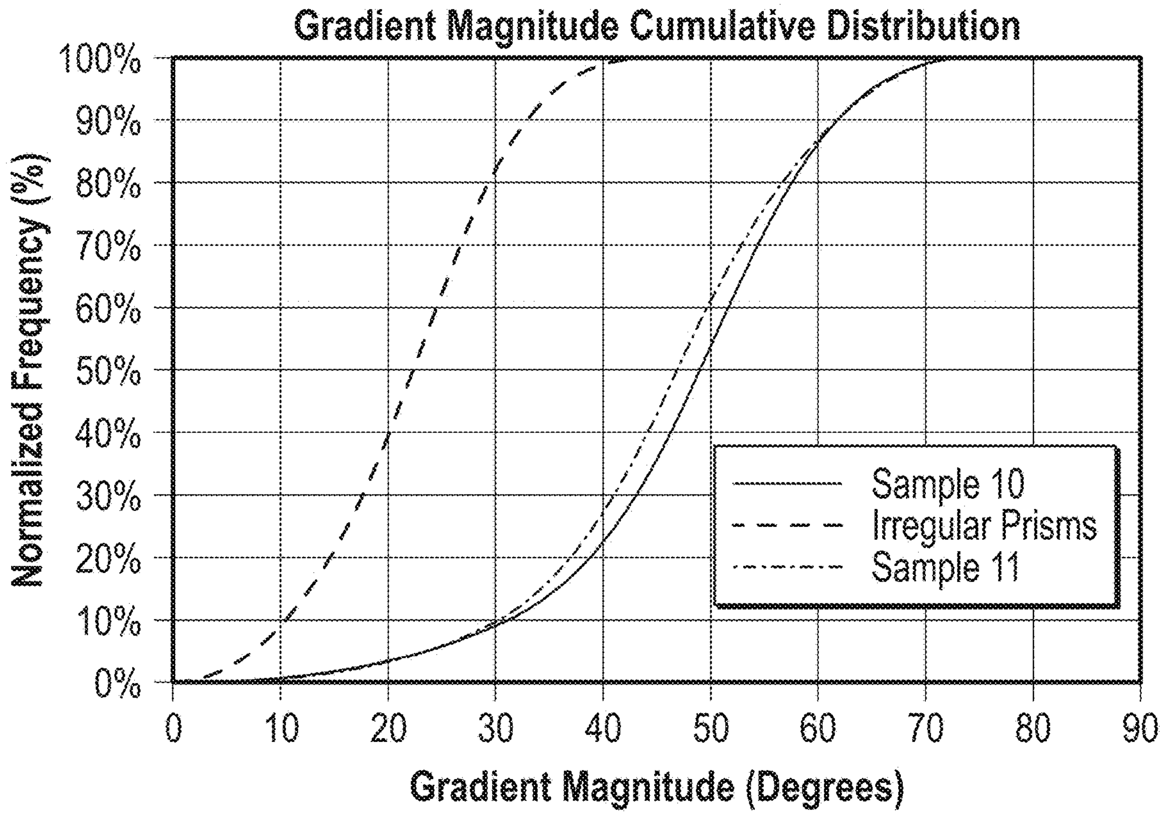
FIG. 27A is a gradient magnitude cumulative distribution graph of a Sample 10 disclosed optical film, Sample 11 disclosed optical film, and an irregular prism optical film.
Figure 27B:
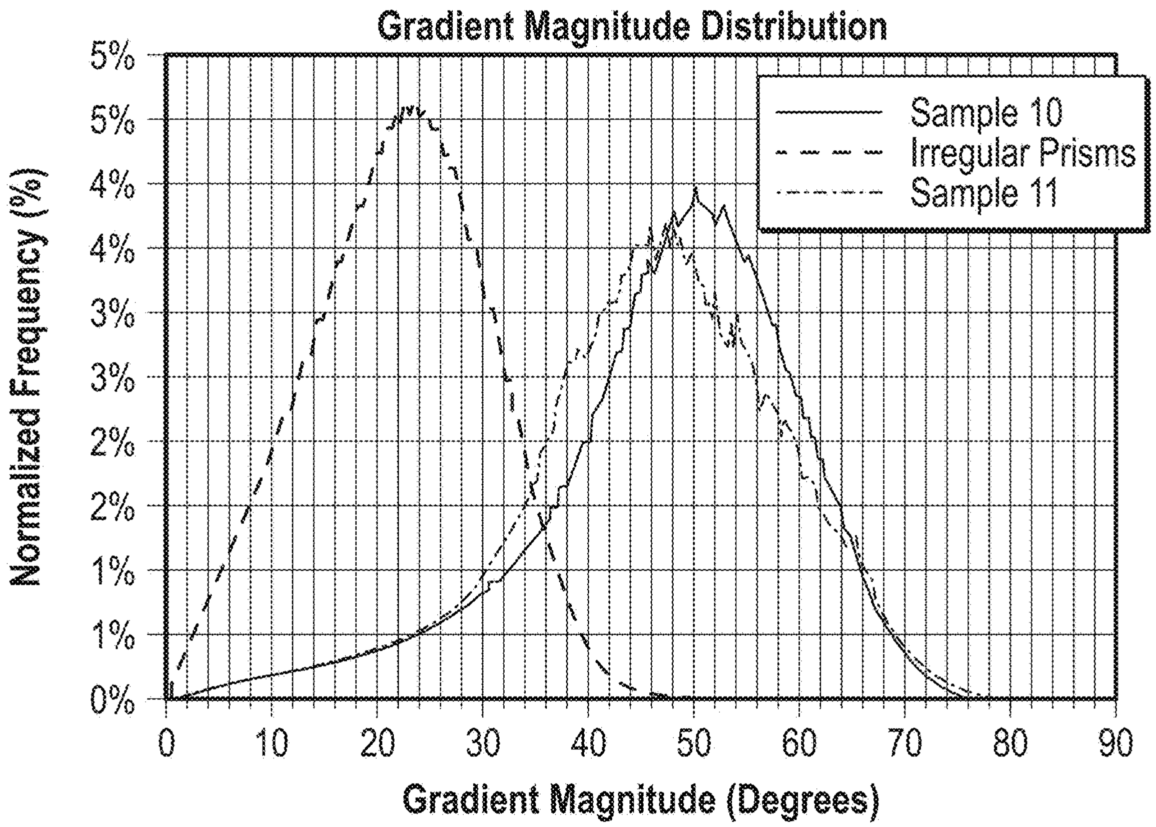
FIG. 27B is a gradient magnitude distribution graph of Sample 10, Sample 11, and the irregular prism optical film.

Facets 231 may cover substantially all of microstructured surface 211. In some examples, facets 231 may cover greater than 90% of microstructured surface 211. Surface coverage of microstructured surface 211 may be represented as percent microstructured surface per solid angle in units of square degrees for particular gradient magnitude ranges or limits. In some examples, less than 0.010% of the microstructured surface 211 per solid angle in units of square degrees has gradient magnitudes of about 10 degrees, while less than about 0.008% of the microstructured surface 211 per solid angle in units of square degrees have gradient magnitudes of about 30 degrees. See, for example, FIG. 27K. In some examples, less than about 0.008% of the microstructured surface 211 per solid angle in units of square degrees have gradient magnitudes of about 10 degrees, while less than about 0.007% of the microstructured surface per solid angle in units of square degrees have gradient magnitudes of about 30 degrees. In some examples, the microstructured surface 211 per solid angle in units of square degrees having gradient magnitudes of about zero is from about 0.0005% to about 0.01%. In some examples, the microstructured surface 211 per solid angle in units of square degrees having gradient magnitudes of about zero is from about 0.001% to about 0.006%. In some examples, less than about 0.010% of the microstructured surface 211 per solid angle in units of square degrees having gradient magnitudes of less than about 10 degrees, and greater than about 0.008% of the microstructured surface 211 per solid angle in units of square degrees having a gradient magnitude of about 50 degrees. See, for example, FIG. 27L. In some examples, such as examples where a percent planar portions of the microstructured surface are greater than about 10%, less than about 0.010% of the structured surface per solid angle in units of square degrees having gradient magnitudes of about 10 degrees. See, for example, FIGS. 27M and 27N.

A sub-plurality of the plurality of prismatic structures 230 may include facets 231 that comprise a substantially planar central portion surrounded by a substantially curved peripheral portion. In some examples, less than about 20% of the planar central portions of the facets have slopes less than about 40 degrees, less than about 10% of the microstructured surface 211 having slopes less than about 20 degrees.

Facets 231 may be substantially flat. Substantial flatness may be indicated or determined by, for example, a radius of curvature or average curvature of the flat facet 231, such as a radius of curvature greater than ten times an average height of the prismatic structures 230. In some examples, a particular portion of facets 231 of microstructured surface 211 may be substantially flat, such as greater than 30%.

The plurality of prismatic structures 230 may include a plurality of peaks 237 formed at an intersection of two facets 231. Two facets 231 forming a peak 237 may have an associated apex angle 232. Each peak 237 may have an associated radius of curvature that represents the angular sharpness of the peak. For example, peak 237 may have a radius of curvature less than one tenth of an average height of prismatic structures 230. Peak 237 may be substantially defined or sharp, such that a surface area of peak 237 contributes insignificantly to microstructured surface 211. In some examples, surface area of the plurality of peaks 237 is less than 1% of total surface area of microstructured surface 211. A microstructured surface 211 having defined peaks 237 may increase the surface area of facets 231, increase optical gain for a desired transmission range from optical film 210, and reduce wet-out caused near on-axis transmission angles.

Figure 2B:
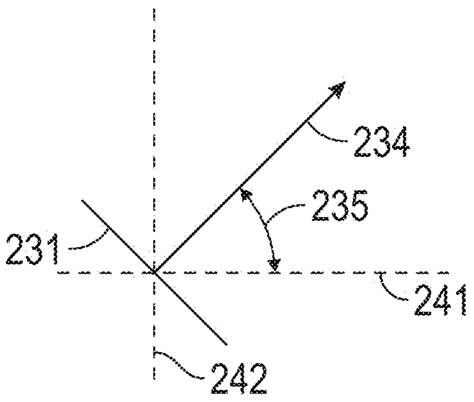
FIG. 2B is a diagram of a top view of a facet of a prismatic structure.

FIG. 2B is a diagram of a top view of a facet 231 of a prismatic structure 230. Facet normal direction 234 may form an azimuthal angle 235 with x-axis 241 (as shown) or y-axis 242. Azimuthal angle 235 may represent the orientation of facet 231 along the reference plane formed by x-axis 241 and y-axis 242. Facets 231 may be oriented throughout a substantially full azimuthal range of azimuthal angles 235, such as 0 to $2\pi$ radians.

Figure 2C:
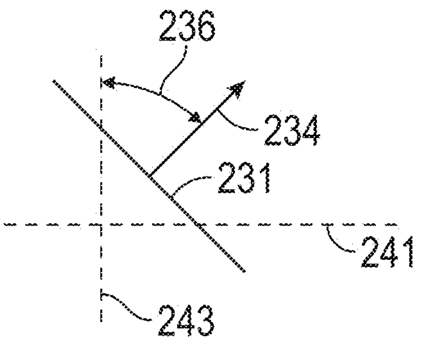
FIG. 2C is a diagram of a side view of a flat facet of a prismatic structure.

FIG. 2C is a diagram of a side view of a flat facet 231 of a prismatic structure 230. Facet normal direction 234 may form a polar angle 236 with z-axis 243. Polar angle 236 may represent an orientation of flat facet 231 with respect to a normal of the reference plane formed by x-axis 241 and y-axis 242. Facets 231 may be oriented throughout a substantially full polar quadrant of polar angles 236, such as 0 to $\pi/2$ radians.

Microstructured surface 211 may have a surface normal distribution of facets 231. The surface normal distribution of facets may represent the normal distribution of facets 231, such as a probability or concentration of a facet 231 having a particular polar angle 235 or azimuthal angle 236. The surface normal distribution of facets 231 includes a surface polar distribution of facets 231 and a surface azimuthal distribution of facets 231.

The surface polar distribution represents a normal distribution of facets 231 at particular polar angles 236. In some examples, the surface polar distribution may be represented as a percentage of facets within a range of polar angles. For example, substantially all facets 231, such as greater than 90%, may have a polar angle within a particular range of polar angles. A particular range of polar angles may include a range of polar angles that produce substantially collimated light, such as within five degrees of the z-axis 243. In some examples, substantially all of facets 231 may have a polar angle 236 of approximately 45 degrees, such as 90% of facets 231 having a polar angle 236 between 40 degrees and 50 degrees. In some examples, the surface polar distribution may be represented as a probability of flat facet 231 having particular polar angles 236.

The surface polar distribution of the plurality of facets 231 may include a peak polar distribution associated with a polar angle or range of polar angles that represent a peak distribution of the plurality of facets 231. The peak polar distribution may be off-axis; that is, the peak polar distribution may not be substantially normal to the reference plane of microstructured surface 211. In some examples, the surface polar distribution has an off-axis peak polar distribution that is at least twice as high as an on-axis polar distribution.

Prismatic structures 230 may be distributed across optical film 210 and their facets oriented across microstructured surface 211 so that the surface polar distribution of facets increases the optical gain of optical film 210 for a particular range of polar angles. In some examples, the surface polar distribution may be configured to create a polar transmission distribution, where the polar transmission distribution represents the transmission of axial collimated light through microstructured surface 211 into an intensity distribution over polar angles θ to π/2. The polar transmission distribution may be associated with the collimated light transmission properties of aggregate conical microstructures. For example, conical microstructures may distribute light with a peak luminance at particular polar angles for particular refractive indices, and the peak luminance may be a particular ratio higher than an on-axis polar transmission, such as twice as high. The surface polar distribution of microstructured surface 211 may include substantially all facets in a polar range that produces collimated light from light at particular incidence angles associated with peak luminance. In some examples, the polar range is selected for peak luminance for light at incidence angles between 32 and 38 degrees. Facets 231 may be oriented throughout a range of polar angles 236, such as 30 to 60 degrees, such that the light transmitted from microstructured surface 211 is substantially collimated.

The surface polar distribution of facets 231 may have a peak

The surface azimuthal distribution represents a distribution of facets 231 at particular azimuthal angles. For example, at high sample sizes, substantially a 360th of all flat facets, such as between 0.1% and 0.5%, or 0.25% and 0.3%, may have an azimuthal angle between a particular angular degree. Prismatic structures 230 may be distributed across optical film 210 and their flat facets oriented across microstructured surface 211 so that the surface azimuthal distribution of facets 231 may create a uniform azimuthal transmission distribution, where the azimuthal transmission distribution represents a transmission of light through microstructured surface 211 at azimuthal angles. The azimuthal transmission of light may be associated with the collimated light transmission properties of aggregate conical microstructures. For example, conical microstructures may distribute light evenly across a full azimuthal range. The surface azimuthal distribution of facets 231 may be uniform within a particular angular resolution across a full 360 degrees. In some examples, the angular resolution is selected based on manufacturing accuracy. The aggregate surface area or number of facets 231 may be substantially the same for each azimuthal angle 235 and the average of the azimuthal angles 235 may be rotationally symmetric. In some examples, the aggregate surface area or number of facets 231 may be evaluated as substantially the same at a particular sample size or resolution of facets 231, such as greater than 10,000 flat facets, as there may be local variation in the azimuthal angles 235.

While prismatic structures 230 may be irregularly distributed and oriented across optical film 210, the aggregate effect of flat facets 231 of prismatic structures 230 is microstructured surface 211 that has a surface area that is evenly distributed over a full range of azimuthal angles on the reference plane to evenly distribute light and a limited range of polar angles to substantially collimate light.

Figure 3:
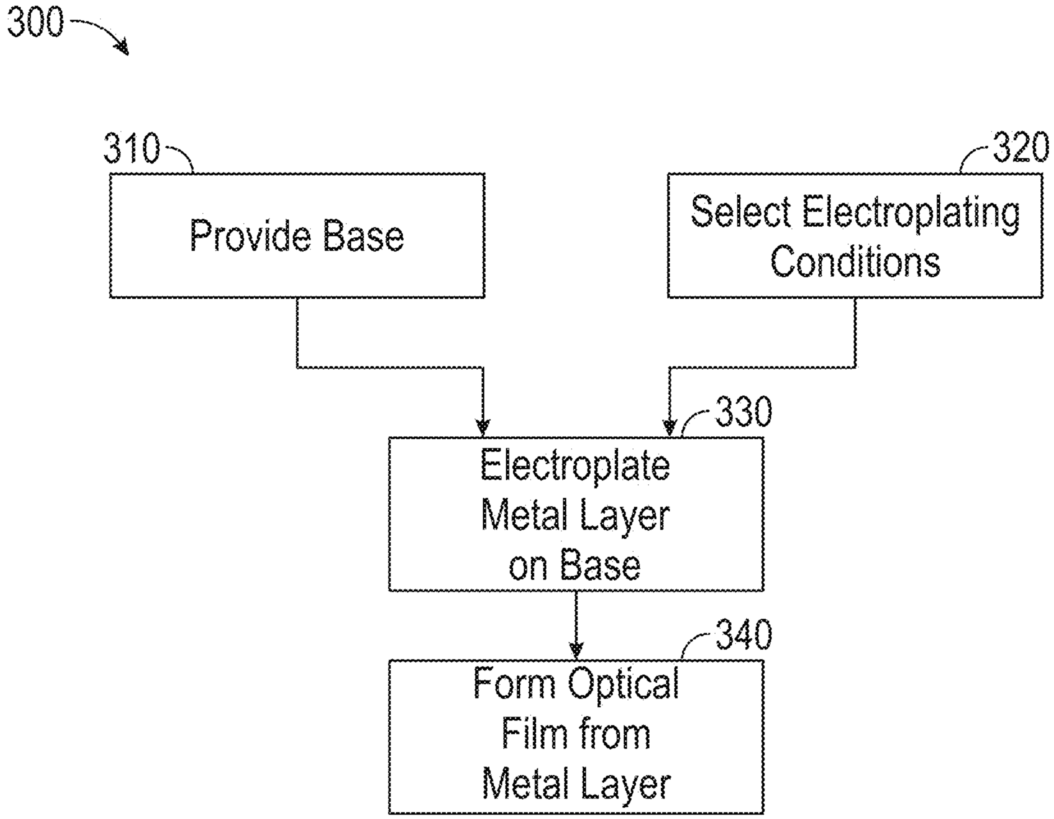
FIG. 3 illustrates an exemplary process for forming an optical film.

FIG. 3 illustrates an exemplary process 300 for forming an optical film, such as optical film 210. Before fabricating the optical film, a microreplication tool may be fabricated that has structured surface properties that correspond to a microstructured surface, such as microstructured surface 211, of the optical film. Alternatively, a microreplication tool having structured surface properties that correspond to the microstructured surface of the optical film may be provided or selected based on the desired microstructured surface of the optical film.

In step 310, a base may be provided to serve as a foundation upon which metal layers can be electroplated. The base can take one of numerous forms, e.g. a sheet, plate, or cylinder. For example, circular cylinders may be used to produce continuous roll goods. The base may be made of a metal, and exemplary metals include nickel, copper, and brass; however, other metals may also be used. The base may have an exposed surface ("base surface") on which one or more electrodeposited layers may be formed in subsequent steps. The base surface may be smooth and flat, or substantially flat. The curved outer surface of a smooth polished cylinder may be considered to be substantially flat, particularly when considering a small local region in the vicinity of any given point on the surface of the cylinder.

In step 320, electroplating conditions may be selected for electroplating the base surface. The composition of the electroplating solution, such as the type of metal salt used in the solution, as well as other process parameters, such as current density, plating time, and substrate moving speed, may be selected so that the electroplated layer is not formed smooth and flat, but instead has a major surface that is structured, and characterized by irregular flat-faceted features, such as features that correspond to desired prismatic structures 230. Selection of a current density, selection of a plating time, and selection of a base exposure rate, such as substrate moving speed, may determine the size and density of the irregular features. Selection of a metal template, such as the type of metal salt used in the electroplating solution, may determine the geometry of the features. For example, the type of metal salt used in the electroplating process may determine the geometry of the deposited metal structures, and thus, may determine the shape of the prismatic structures, such as prismatic structures 230, on the microstructured surface, such as microstructured surface 211.

Figure 36:
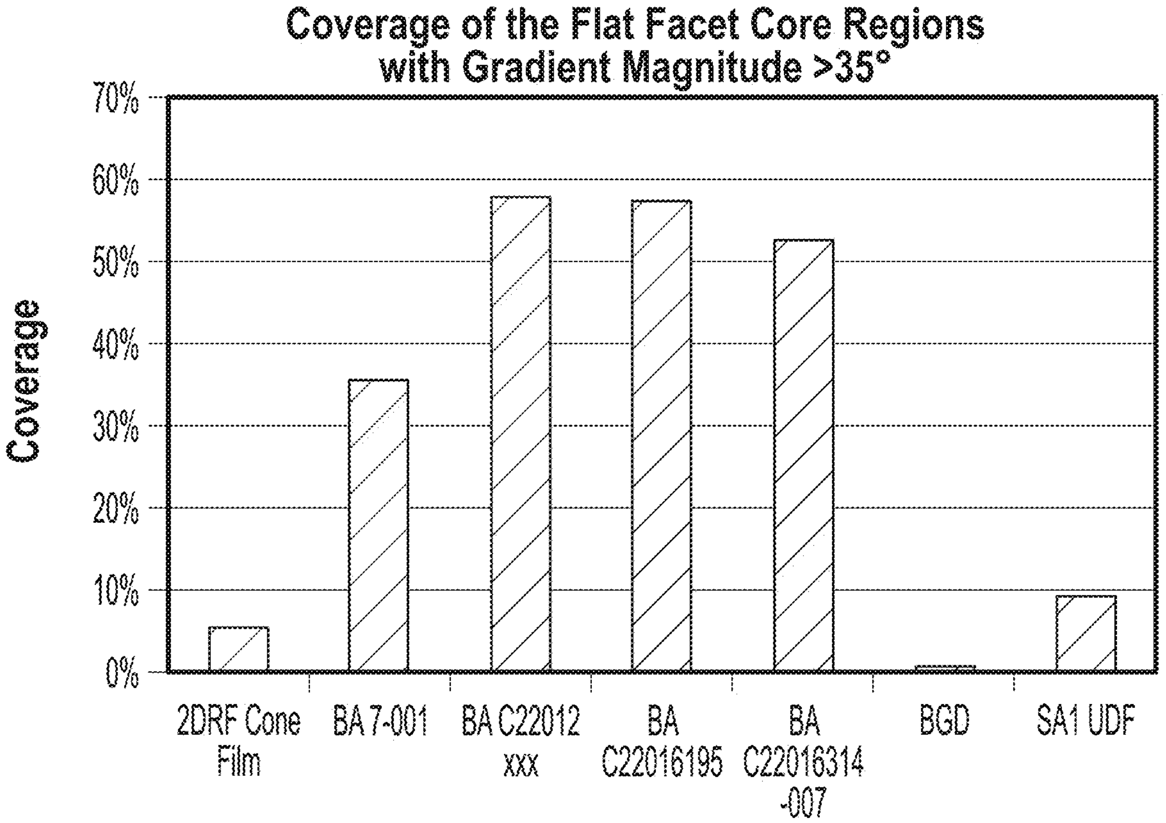
Figure 37:
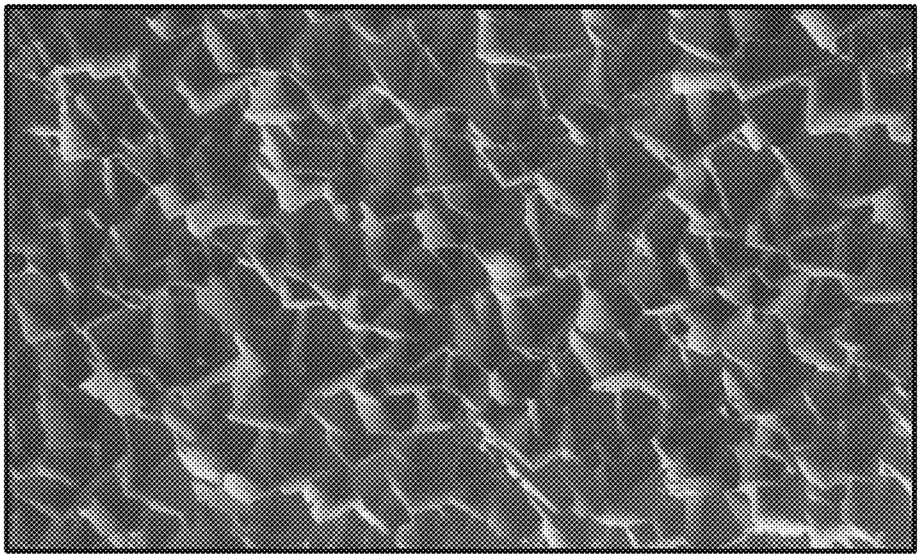

In step 330, a layer of a metal may be formed on the base surface of the substrate using an electroplating process. Before this step is initiated, the base surface of the substrate may be primed or otherwise treated to promote adhesion. The metal to be electroplated may be substantially the same as the metal of which the base surface is composed. For example, if the base surface comprises copper, the electroplated layer formed in step 330 may also be made of copper. To form a layer of the metal, the electroplating process may use an electroplating solution. The electroplating process may be carried out such that the surface of the electroplated layer has a microstructured surface having irregular faces that corresponds to the microstructured surface 211. Metal may accrete inhomogeneously on the microstructured surface of the roll, forming protuberances. The microstructured surface of the optical film replicates with peaks or valleys, etc., relative to the microstructured surface of the roll. The location and disposition of the deposited metal structures on the microstructured roll is random. The structured character and roughness of a representative first major surface can be seen in the SEM image of an optical film of FIG. 36, the film being microreplicated from the surface of an electroplated layer made in accordance with step 330.

After step 330 is completed, the substrate with the electroplated layer(s) may be used as an original tool with which to form optical diffusing films. In some cases the structured surface of the tool, which may include the structured surface of the electroplated layer(s) produced in step 330, may be passivated or otherwise protected with a second metal or other suitable material. For example, if the electroplated layer(s) are composed of copper, the structured surface can be electroplated with a thin coating of chromium. The thin coating of chromium or other suitable material is preferably thin enough to substantially preserve the topography of the structured surface.

Rather than using the original tool itself in the fabrication of optical diffusing films, one or more replica tools may be made by microreplicating the structured surface of the original tool, and the replica tool(s) may then be used to fabricate the optical films. A first replica made from the original tool will have a first replica structured surface which corresponds to, but is an inverted form of, the structured surface. For example, protrusions in the structured surface correspond to cavities in the first replica structured surface. A second replica may be made from the first replica. The second replica will have a second replica structured surface which corresponds to, and is a non-inverted form of, the structured surface of the original tool.

After the structured surface tool is made, for example, in step 330, optical films, such as optical film 210, having the same structured surface (whether inverted or non-inverted relative to the original tool) can be made in step 340 by microreplication from the original or replica tool. The optical film may be formed from the tool using any suitable process, including e.g. embossing a pre-formed film, or cast-and-curing a curable layer on a carrier film. For example, optical film 210 having microstructured surface 211 may be prepared by: (a) preparing a polymerizable composition; (b) depositing the polymerizable composition onto a master negative structured surface of the structured surface tool formed in step 330 in an amount sufficient to fill the cavities of the master; (c) filling the cavities by moving a bead of the polymerizable composition between a substrate, such as substrate 220, and the master; and (d) curing the polymerizable composition. In the embodiment above, optical film 210 and substrate 220 may be separate layers bonded together. Another method may include directly replicating the mold onto an extruded or cast substrate material, resulting in a substrate 220 and optical film 210 that is monolithic.

EXAMPLES

Light Transmission Characterization

Samples (Sample 1, Sample 2, and Sample 3) of optical films according to the current disclosure were fabricated according to techniques described herein, including FIG. 3 described above. A tool was fabricated using similar methods as disclosed US patent application 2010/0302479 entitled "Optical Article". The tool was used to make the optical films by means of a cast and cure process such as that described in U.S. Pat. No. 5,175,030. The resin used in the cast and cure process was a resin suitable for optical use. Comparative examples of optical films having (1) hexagonal packed array of cones, (2) waffle grid of prisms, (3) packed array of partial spheres, and (4) round-peaked irregular prisms were also provided.

The optical films were tested with a collimated light transmission probe to determine the optical properties of the optical film, such polar transmission distribution and azimuthal transmission distribution. FIG. 4 is an exemplary method for generating light transmission information for an optical film through collimated light transmission. A light probe having axially collimated LED light was placed in front of the microstructured surface of the optical film and aligned to a polar and azimuthal angle of 0 degrees. A detector was placed behind the flat major surface of the optical film. Axially collimated light from the light probe was processed through the optical film and the angular scattering of the source light due to the microstructured surface of the optical film was measured on the detector. Collimated light transmission may be used to determine a base angle for facets of the microstructured surface that corresponds to a polar range of the surface polar distribution of the microstructured surface.

Surface Characterization

Four samples (Sample 6A/B, Sample 7A/B, Sample 8, and Sample 9) of optical films according to the current disclosure were fabricated according to techniques described herein, including FIG. 3 and Examples 1-3 described above. Comparative examples of: (1) an optical film having round-peaked irregular prisms, (2) an optical film having a hexagonal packed array of cones, (3) an optical film having a packed array of partial spheres, and (4) an optical film having an array of pyramidal prisms were also provided. AFM images of the samples were taken and used for image analysis, as will be described below.

The AFM images were analyzed for flatness and angular orientation. Code was written to add a facet analysis functionality to a slope analysis tool. The facet analysis functionality was configured to identify a core region of a facet for analysis of the flatness and orientation of the facets of a sample. Prefilter height maps were selected to minimize noise (e.g. media 3 for AFM and Fourier low pass for confocal microscopy) and shift the height map so that the zero height is a mean height.

A gcurvature and tcurvature were calculated at each pixel. The gcurvature at a pixel is the surface curvature calculated in the gradient direction using the heights of the following three points: $Z(x, y)$, $Z(x-dx, y-dy)$, and $Z(x+dx, y+dy)$, where $(dx,dy)$ is parallel to the gradient vector and the magnitude of $(dx, dy)$=Sk/Skdivosor, where Sk is the core roughness depth and Skdivisor is a unitless parameter set by the user. The magnitude of $(dx,dy)$ may be rounded to the nearest pixel and set to be at a minimum, such as 3 pixels. The tcurvature is the same as the gcurvature except that the direction transverse to the gradient is used in the calculation of the curvature, instead of parallel.

Thresholds for each pixel were used to obtain a binary map of the flat facets. The thresholds include: (1) max (gcurvature, tcurvature)<rel_curvecutoff/R, where R=min (xcrossing_period, ycrossing_period)/2 and xcrossing_period and ycrossing_period are the mean distances between zero crossings in the x,y direction, respectively; and (2) gslope<facetslope_cutoff.

Image processing steps may be applied to clean up the binary image. The image processing steps may include: erode, remove facets less than N pixels, dilate twice, erode, where N=ceil(r*r*minfacetcoeff) pixels, r is the magnitude of (dx,dy) in pixels, and ceil is a function that rounds up to the nearest integer. The images were then generated and the statistics and distributions of the facet regions calculated.

Examples 1, 2, 3

Figure 5A:
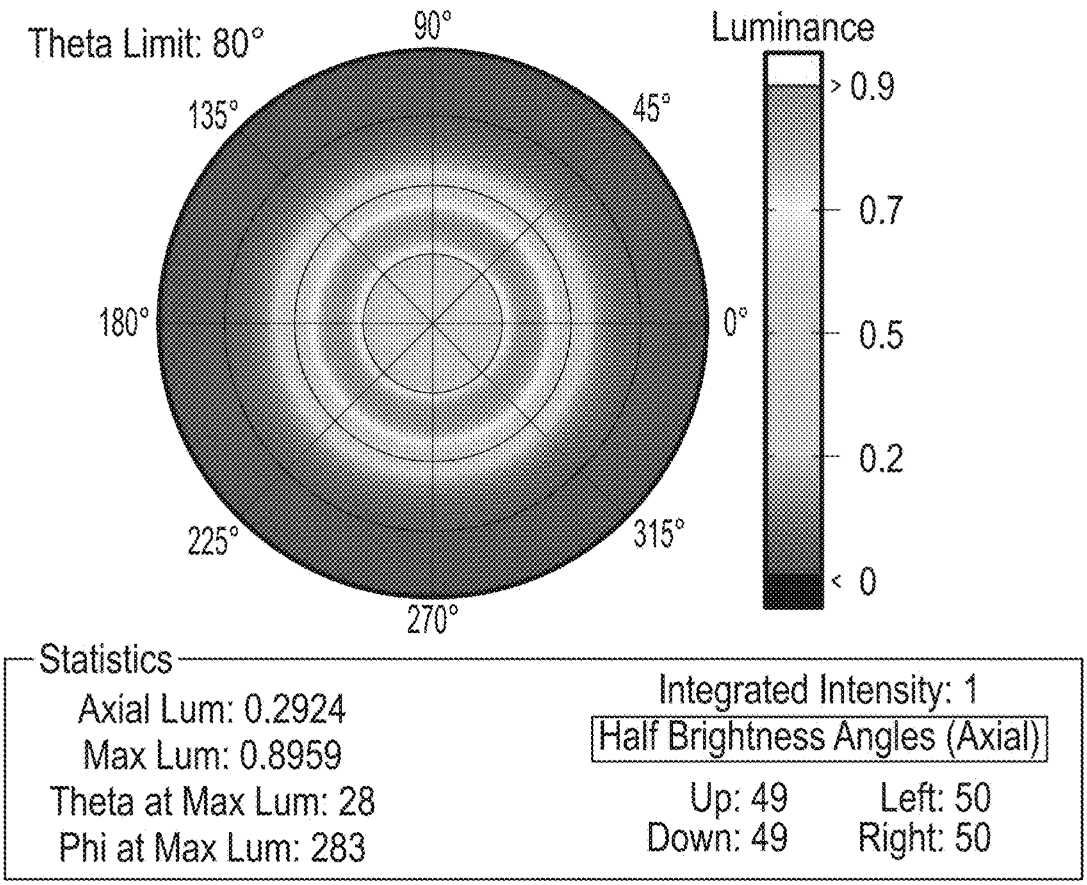
FIGS. 5A, 6A, and 7A are conoscopic plots of light intensity at polar and azimuthal angles for Samples 1, 2, and 3, respectively, of optical films disclosed herein.
Figure 6A:
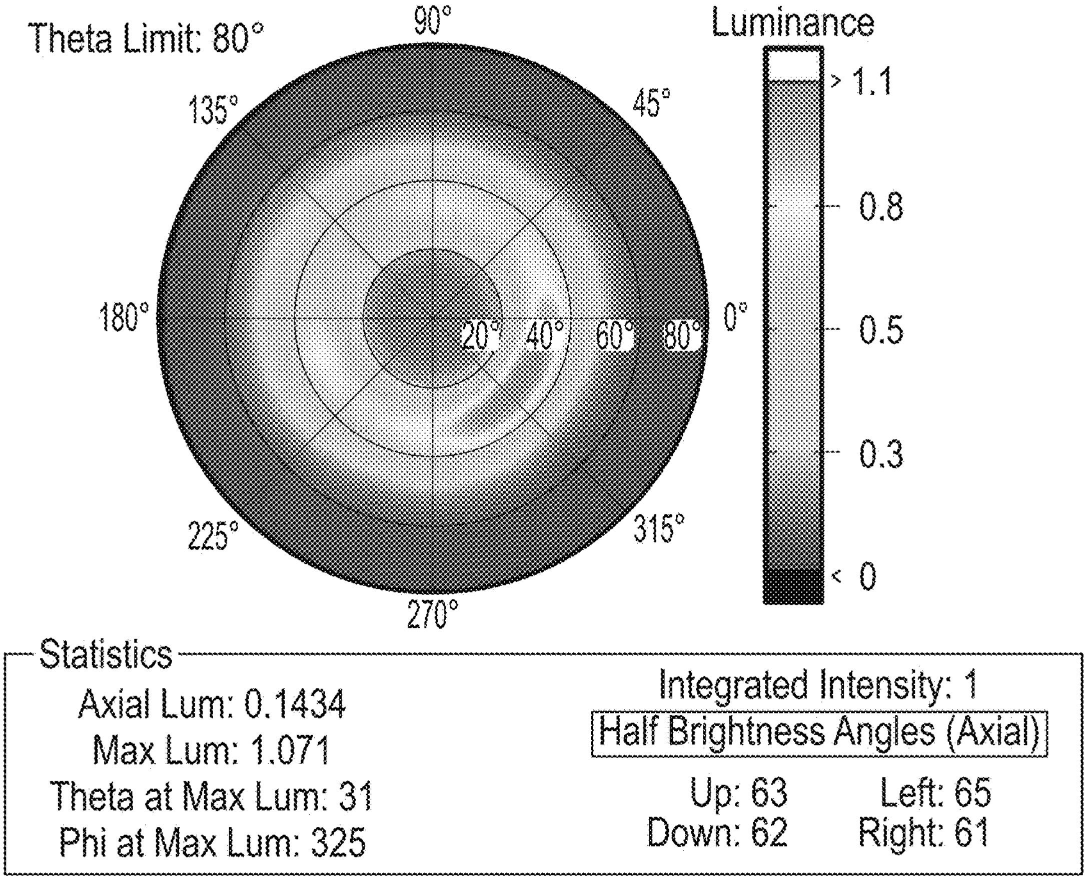
Figure 7A:
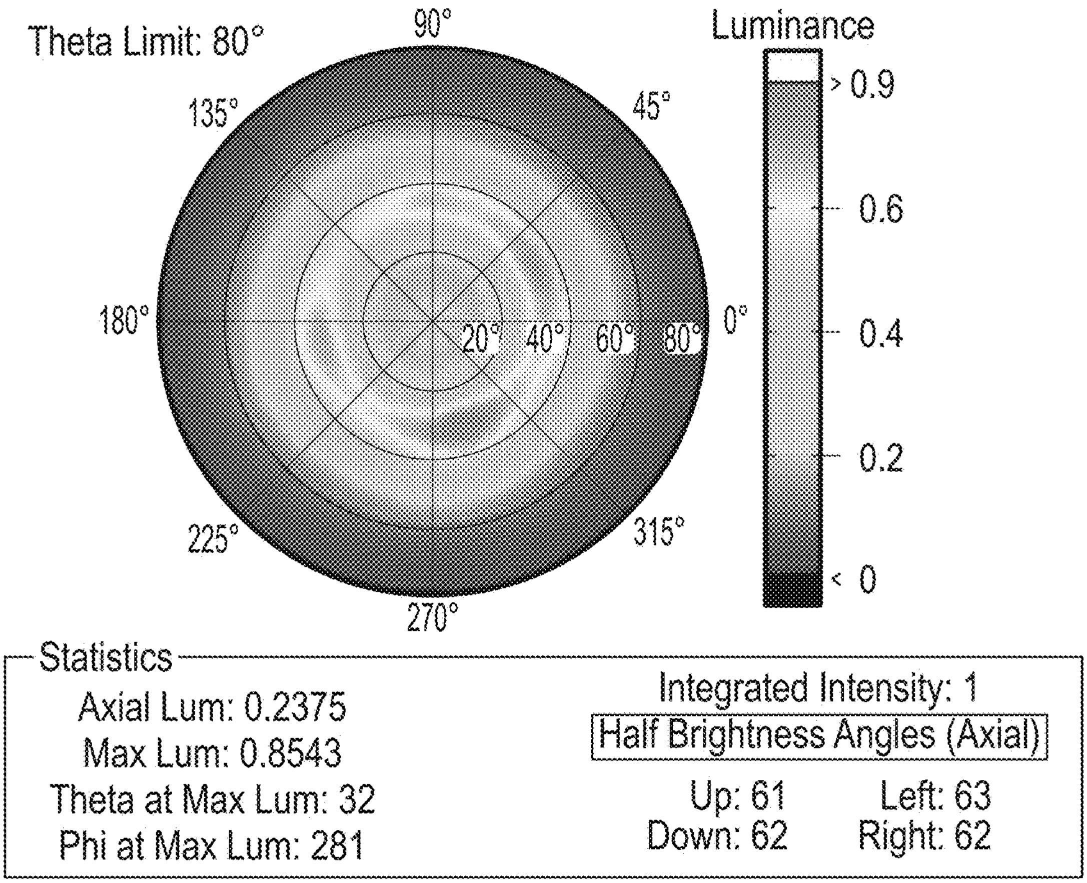

FIGS. 5A, 6A, and 7A are conoscopic plots of light intensity at polar and azimuthal angles for Samples 1, 2, and 3, respectively, of optical films disclosed herein. Each sample shows a polar transmission distribution that is off-axis and concentrated in a polar range, and an azimuthal transmission distribution that is substantially uniform over an entire range.

Figure 5B:
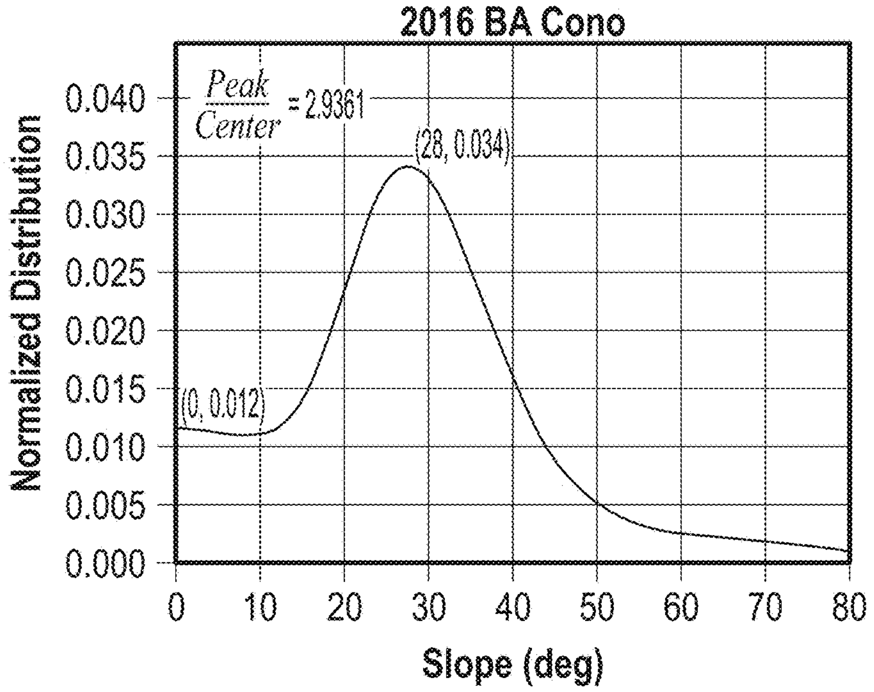
FIGS. 5B, 6B, and 7B are graphs of an average polar slope (x-axis) for a normalized polar transmission distribution (y-axis).
Figure 6B:
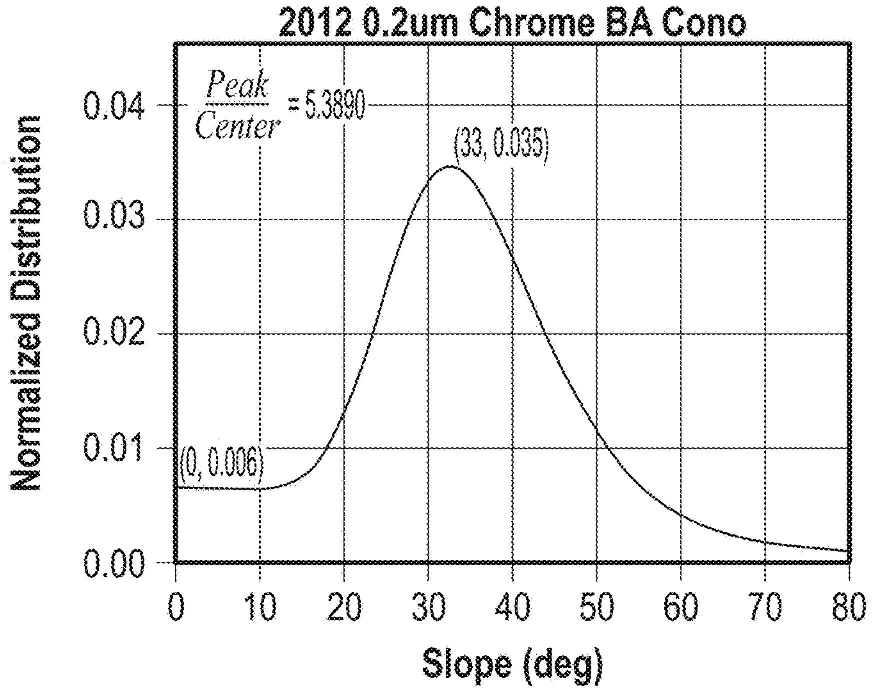
Figure 7B:
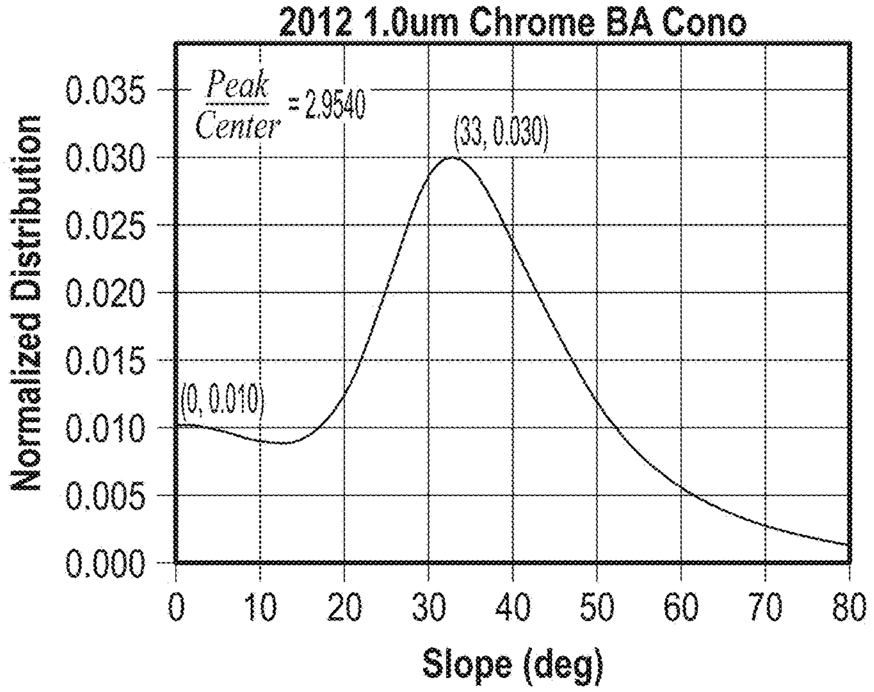

FIGS. 5B, 6B, and 7B are graphs of an average polar slope (x-axis) for a normalized polar transmission distribution (y-axis). As observed in FIGS. 5B, 6B, and 7B, each sample has a peak polar transmission angle and a concentrated polar range of polar angles for the three samples. Also documented is a ratio of peak polar transmission angle to an on-axis (0 degree) polar angle. A pronounced peak polar transmission angle and a high ratio of peak polar transmission to on-axis polar transmission may indicate a conical transmission distribution and may correlate with a substantially uniform surface azimuthal distribution of facets and concentrated, off-axis surface polar distribution of facets.

Comparative Example 1—Hexagonal Packed Array of Cones

Figure 8A:
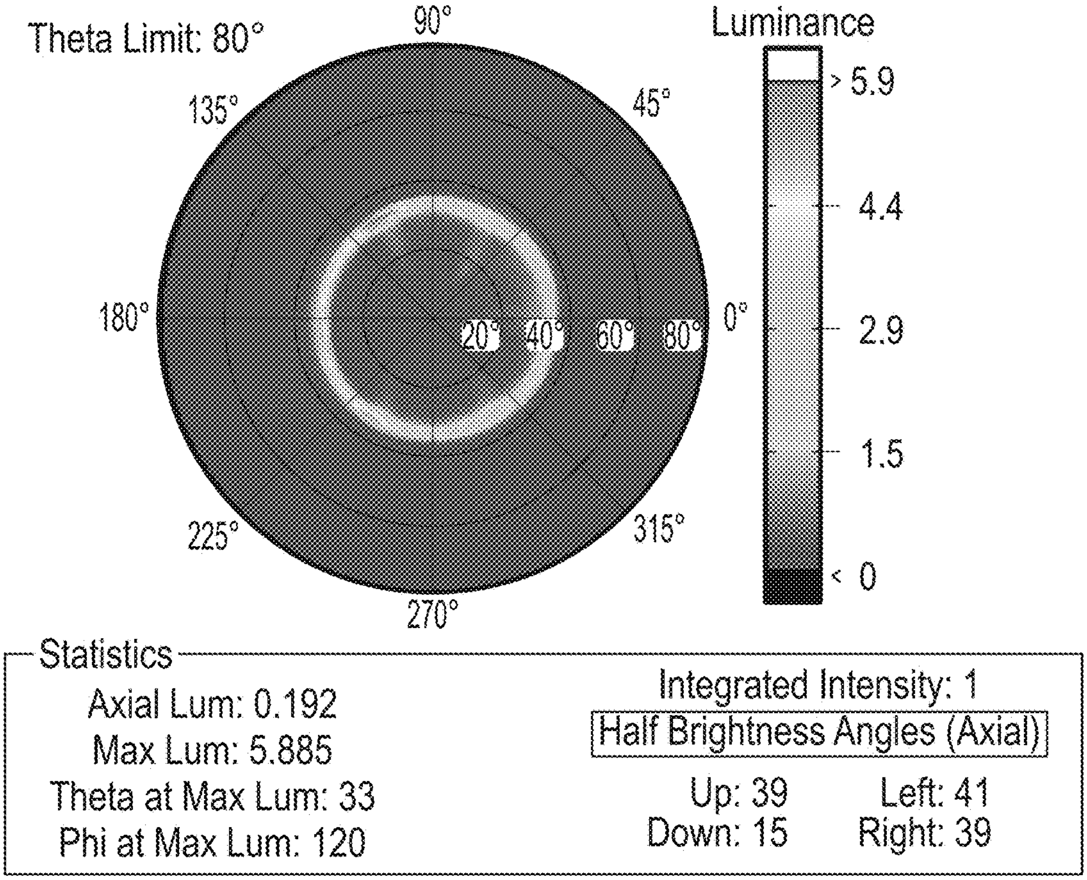
FIG. 8A is a conoscopic plot of light intensity at polar and azimuthal angles for a sample optical film having hexagonal packed array of cones.
Figure 8B:
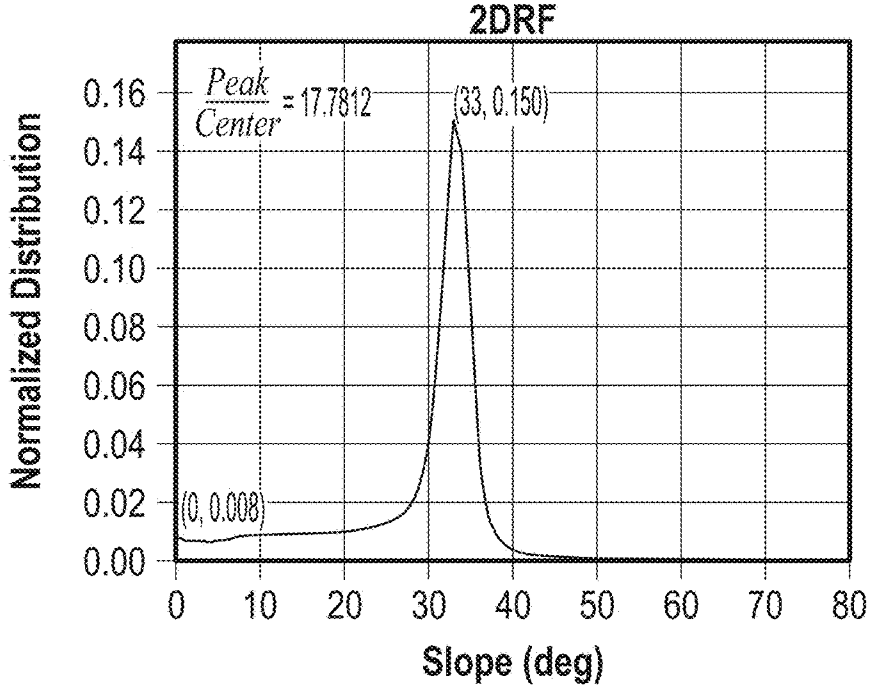
FIG. 8B is a graph of an average polar slope (x-axis) for a normalized polar transmission distribution (y-axis).

FIG. 8A is a conoscopic plot of light intensity at polar and azimuthal angles for a sample optical film having hexagonal packed array of cones. Each cone may have curved sides with a hexagonal base and may be arranged in a patterned array, such as that of FIG. 19. High relative luminance at certain azimuthal angles indicates a non-uniform azimuthal transmission distribution correlating to a non-uniform surface azimuthal distribution, such as the patterned hexagonal peaks of the cones. FIG. 8B is a graph of an average polar slope (x-axis) for a normalized polar transmission distribution (y-axis). The sample has a highly concentrated polar transmission distribution and a very high peak polar transmission angle to on-axis polar angle.

Comparative Example 2—Grid of Prisms

Figure 9A:
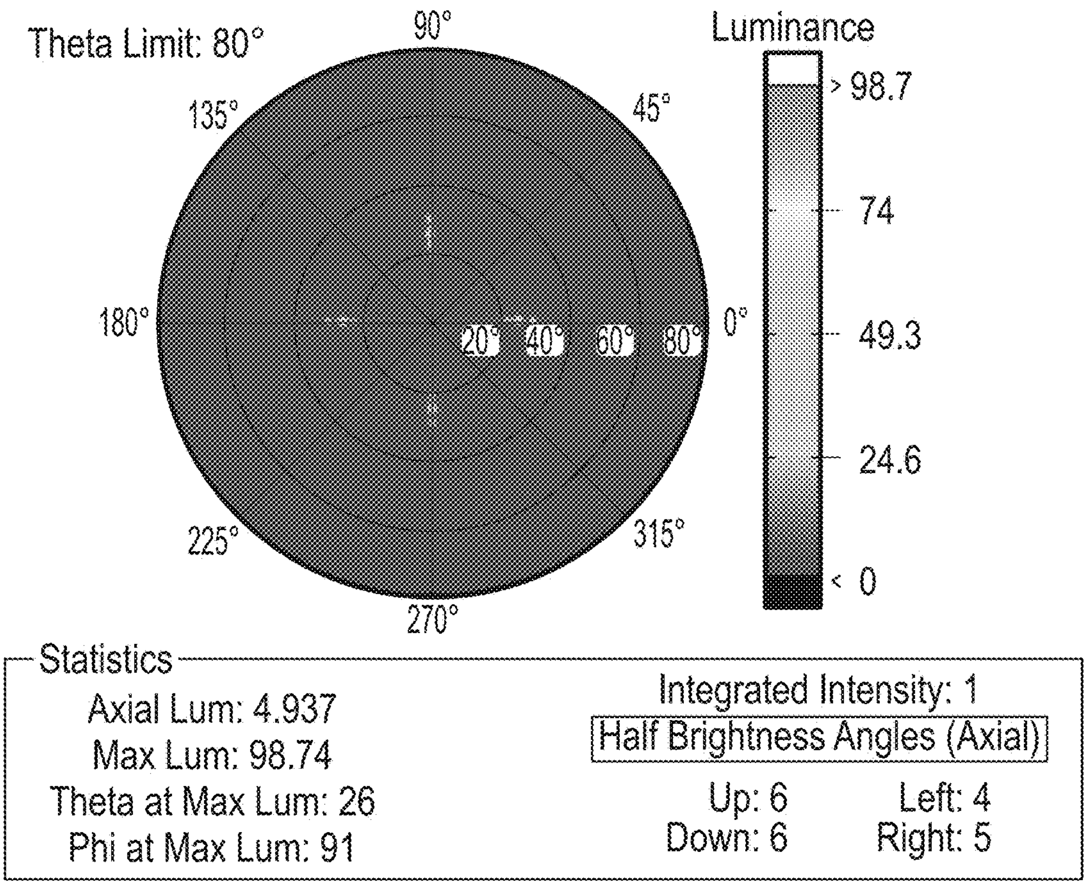
FIG. 9A is a conoscopic plot of light intensity at polar and azimuthal angles for a sample optical film having a waffle-like grid of prisms.
Figure 9B:
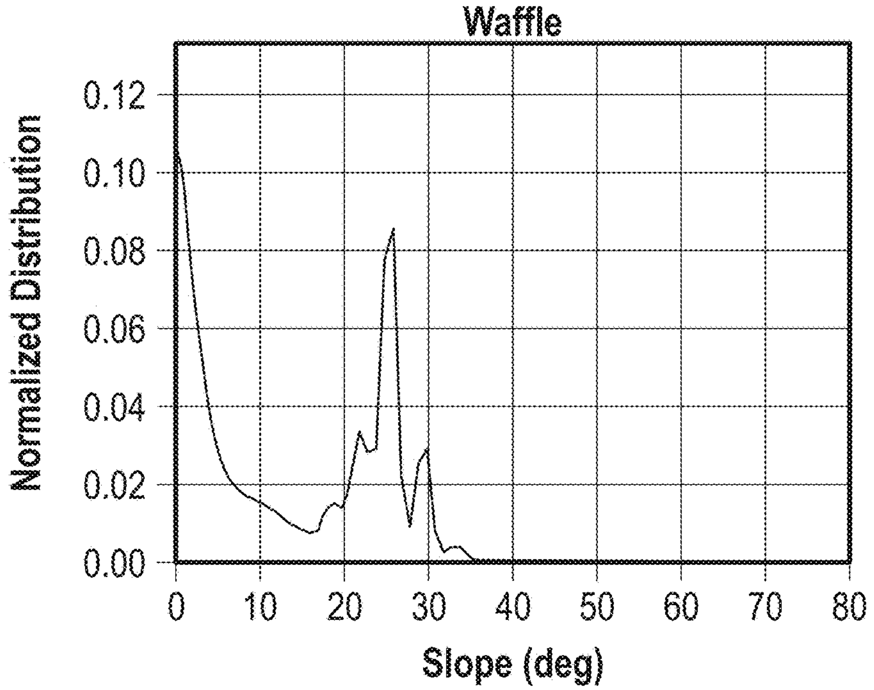
FIG. 9B is a graph of an average polar slope (x-axis) for a normalized polar transmission distribution (y-axis).

FIG. 9A is a conoscopic plot of light intensity at polar and azimuthal angles for a sample optical film having a waffle-like grid of prisms. Each flat prism face may be oriented at one of four square angles. High relative luminance at certain azimuthal angles indicates a non-uniform azimuthal transmission distribution correlating to a non-uniform azimuthal distribution, such as the four square angles of the prisms. FIG. 9B is a graph of an average polar slope (x-axis) for a normalized polar transmission distribution (y-axis). The multiple peak polar transmission angles indicate an uneven prism surface, while a high on-axis polar angle indicates a significantly flat or rounded surface at a prism apex.

Comparative Example 3—Partial Spheres

Figure 10A:
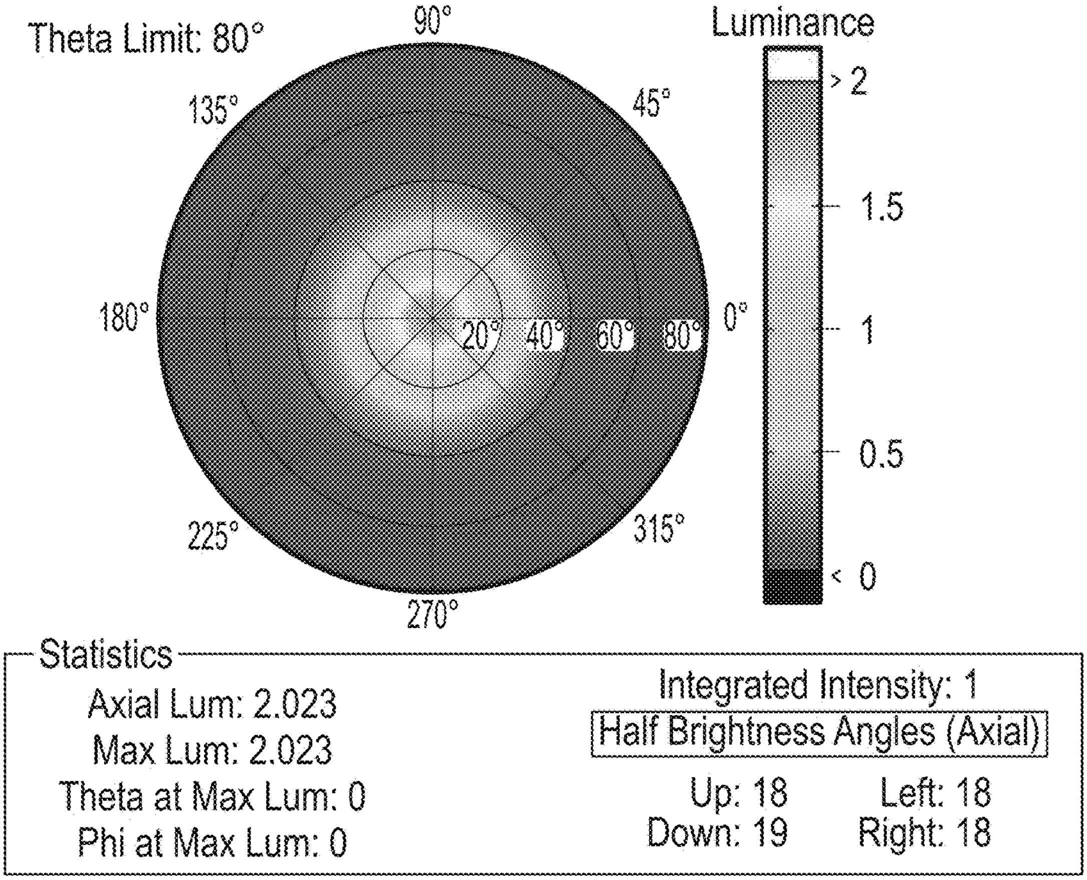
FIG. 10A is a conoscopic plot of light intensity at polar and azimuthal angles for a sample optical film having an array of partial spheres.
Figure 10B:
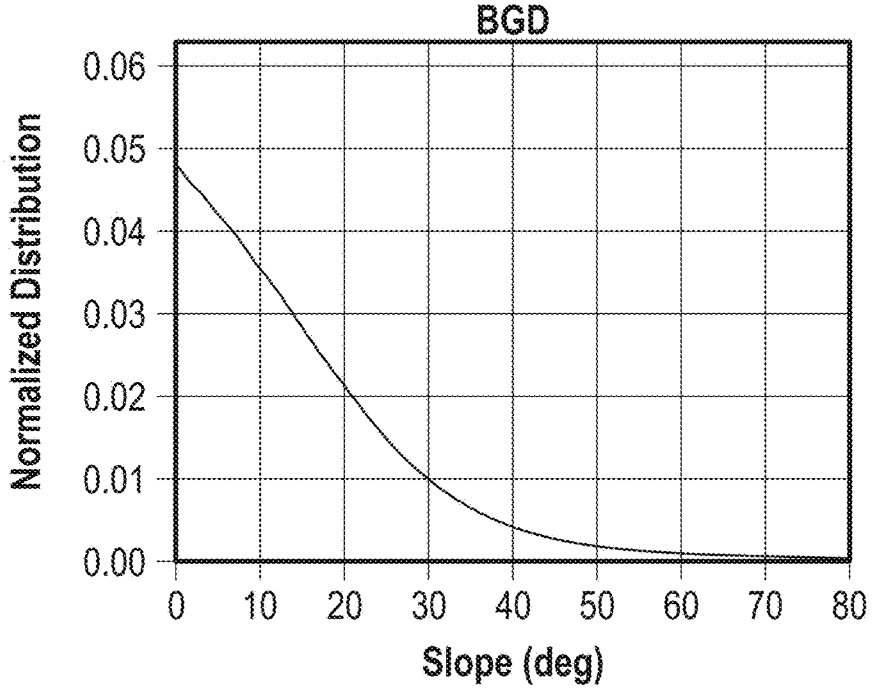
FIG. 10B is a graph of an average polar slope (x-axis) for a normalized polar transmission distribution (y-axis).

FIG. 10A is a conoscopic plot of light intensity at polar and azimuthal angles for a sample optical film having an array of partial spheres. Each partial sphere may have rounded sides with a high on-axis polar component. FIG. 10B is a graph of an average polar slope (x-axis) for a normalized polar transmission distribution (y-axis). The sample has a high on-axis polar transmission distribution.

Comparative Example 4—Rounded Irregular Prisms

Figure 11A:
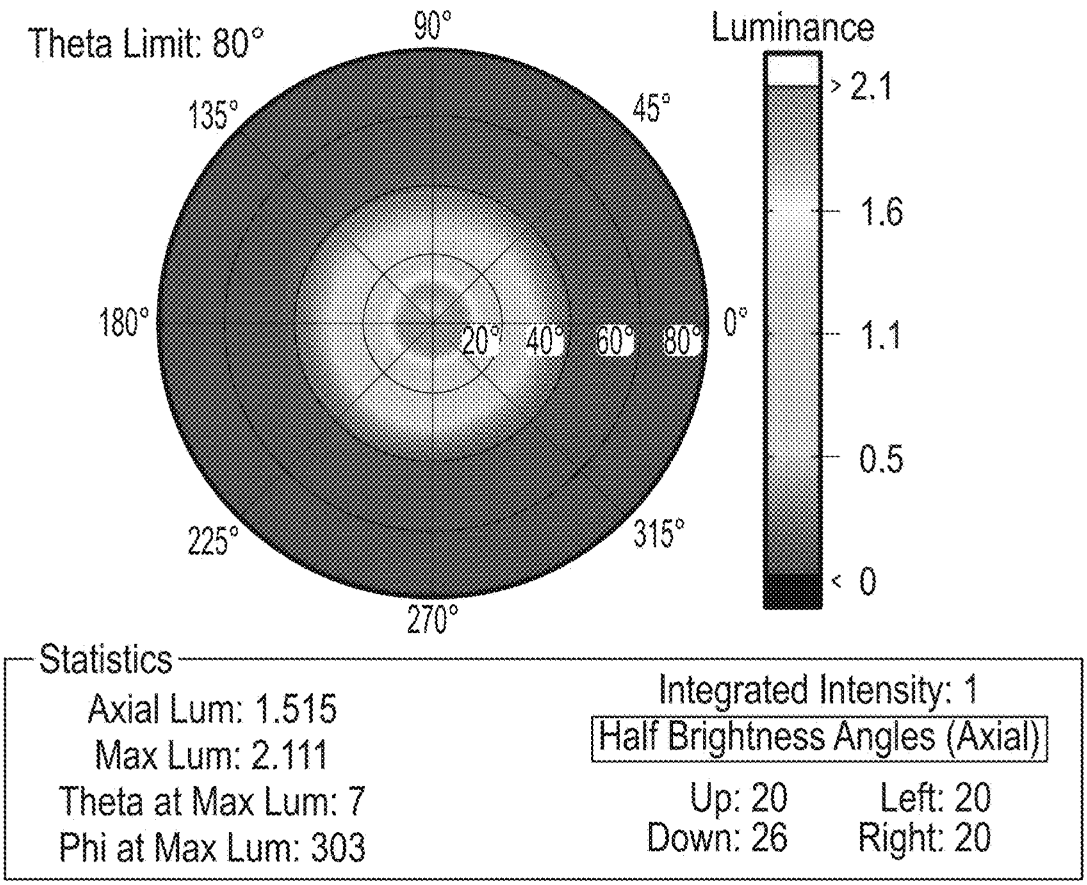
FIG. 11A is a conoscopic plot of light intensity at polar and azimuthal angles for a sample optical film having round-peaked irregular prisms.
Figure 11B:
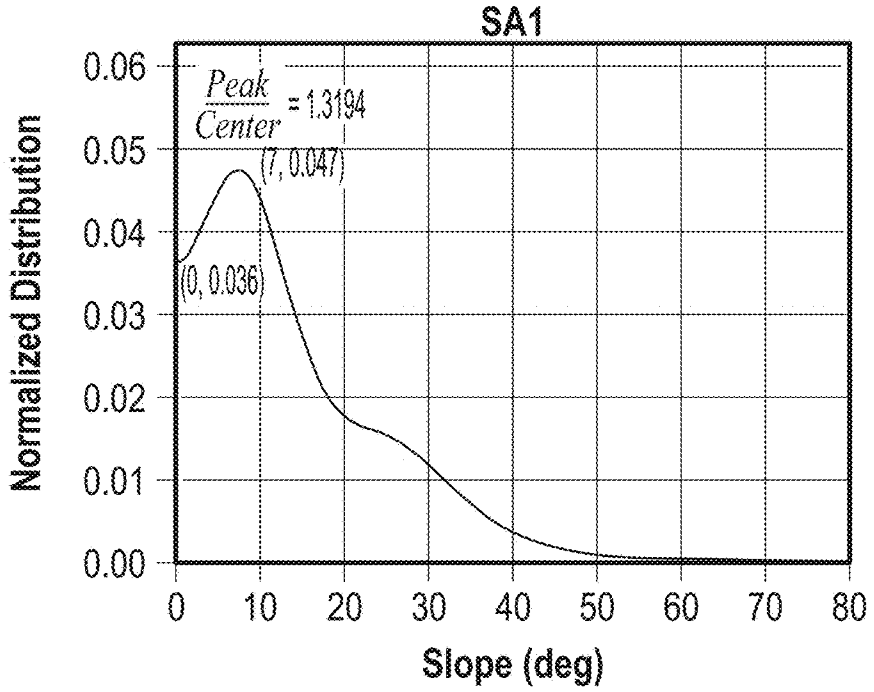
FIG. 11B is a graph of an average polar slope (x-axis) for a normalized polar transmission distribution (y-axis).

FIG. 11A is a conoscopic plot of light intensity at polar and azimuthal angles for a sample optical film having round-peaked irregular prisms. The irregular prisms may have curved sides that meet at rounded peaks, such as in FIGS. 18A and 18B. FIG. 11B is a graph of an average polar slope (x-axis) for a normalized polar transmission distribution (y-axis). The peak polar transmission angle of the sample is near to the on-axis transmission angle, and the low ratio of peak polar transmission to on-axis polar transmission may indicate a rounded peak between prism surfaces.

Example 4

Figure 12A:
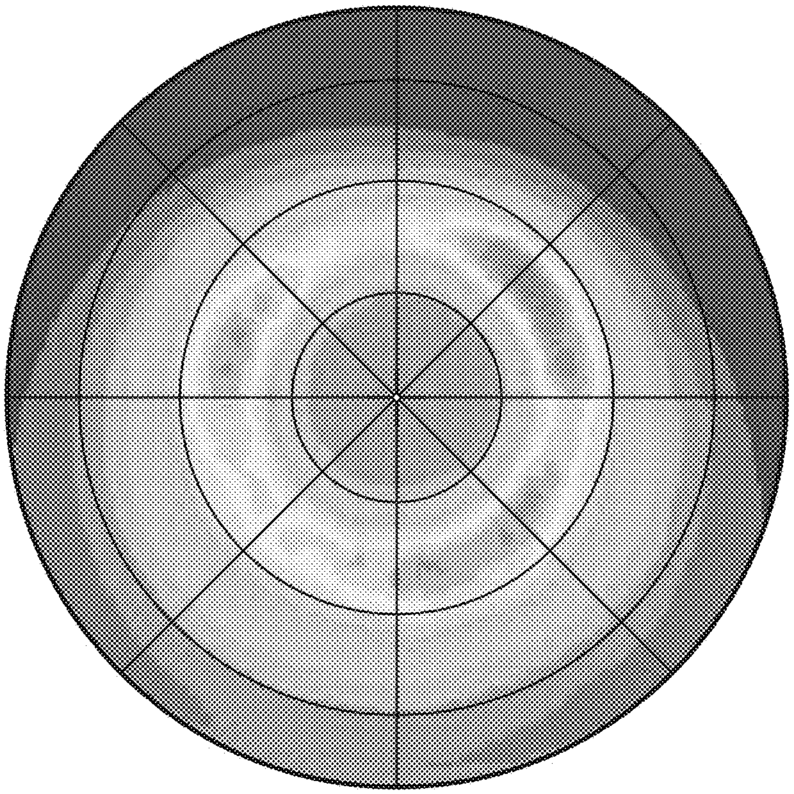
FIG. 12A is a conoscopic representation of confocal slope data of polar and azimuthal angles for the sample optical film.
Figure 12B:
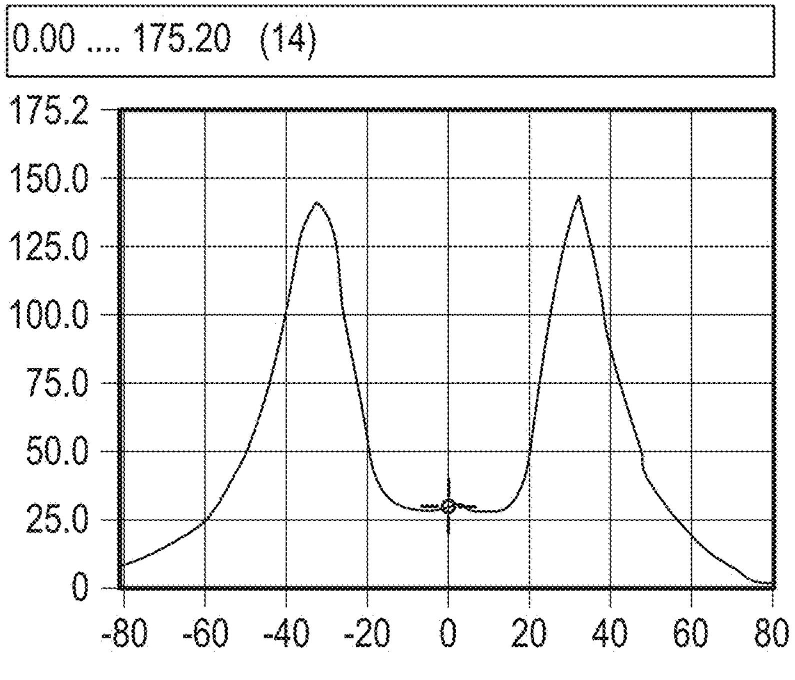
FIG. 12B is a graph of slope frequency (y-axis) versus polar angle (x-axis).

A fourth sample optical film (Sample 4) as disclosed herein was prepared according to FIG. 3 and the method described above. FIG. 12A is a conoscopic representation of confocal slope data of polar and azimuthal angles for the sample optical film. In this example, polar angle and azimuthal angle may correlate to a polar angle and an azimuthal angle, respectively, of the flat facets of the optical film. As can be seen in FIG. 12A, the slope distribution is highest at a particular polar angle range and substantially evenly distributed across an azimuthal angle range. A peak polar distribution angle is substantially constant across azimuthal angles. FIG. 12B is a graph of slope frequency (y-axis) versus polar angle (x-axis). The polar distributions of the respective opposing azimuthal angles substantially correlate, indicating substantially uniform azimuthal distribution.

Example 5

Figure 14A:
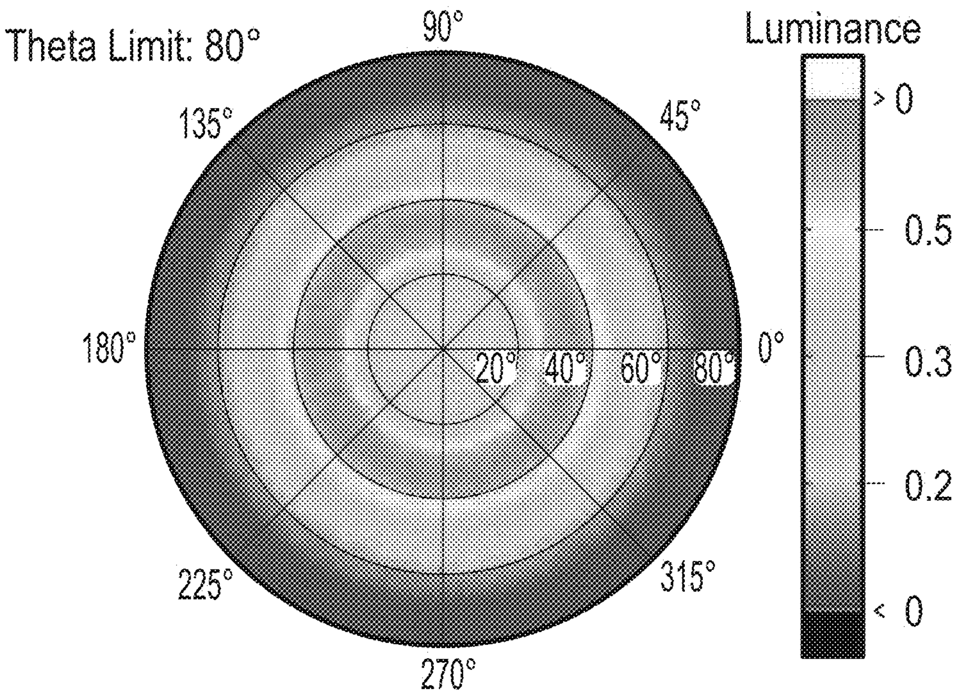
FIG. 14A is a chart showing light intensity for an inverted conical structure at polar angles from a flat major surface of the conical structure and azimuthal angles along a major surface of the conical structure.

An optical conical structure was modeled to determine the optical properties of the optical conical structure. The optical conical structure simulated, for example, refraction and Fresnel reflection at surfaces of the optical conical structure. FIG. 13 is a table of modeled cone gain versus various cone structural parameters. A number of cones were modeled to evaluate cone gain versus cone structural parameters with respect to gain obtained in optical films. Factors varied across the cones include, for example, structure (refractive) index, protrusion surface fraction, protrusion aspect ratio (height vs. radius), and a surface roughness characterized by a Gaussian distribution width of surface normal with respect to the geometric conical surface normal. FIG. 14A is a chart showing light intensity for an inverted conical structure at polar angles from a flat major surface of the conical structure and azimuthal angles along a major surface of the conical structure.

Figure 14B:
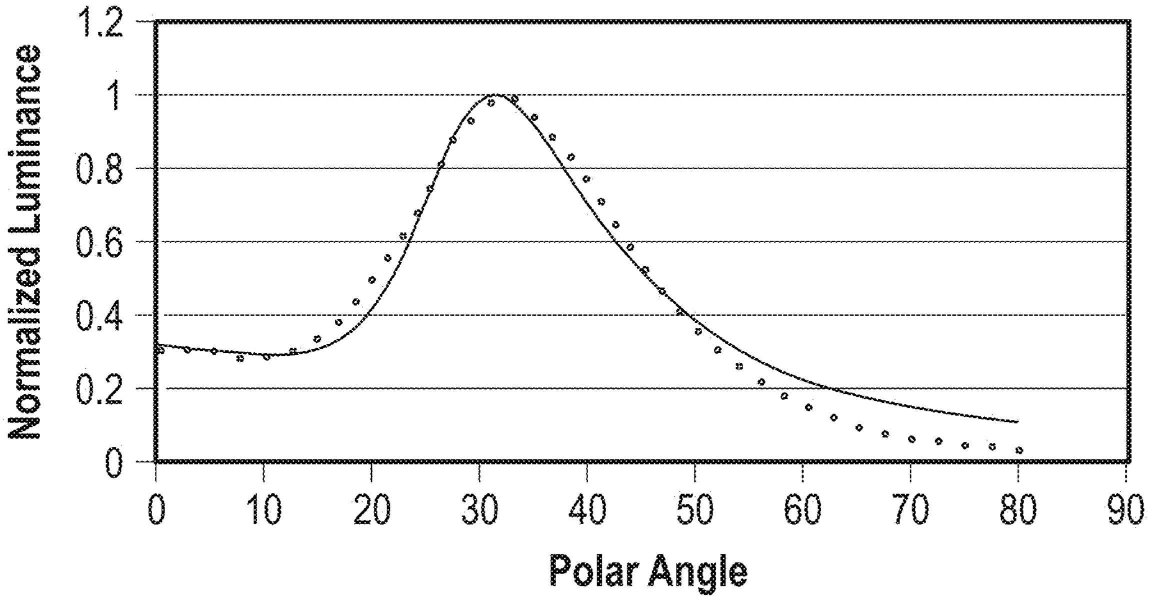
FIG. 14B is a graph of normalized luminance for a range of surface polar angles for Sample 5 and a simulated conical structure.

The optical properties of a sample (Sample 5) of the optical film were compared with the optical properties of the conical structure model. FIG. 14B is a graph of normalized luminance for a range of surface polar angles for Sample 5 and a simulated conical structure. As can be seen in FIG. 14A, the polar plot of the luminance for the optical film has an azimuthally smooth appearance. As can also be seen in FIG. 13 and FIG. 14B, the collimated light optical transmission properties of the optical film, such as measured optical gain, compare substantially to the collimated light optical transmission properties, such as simulated optical gain, of the simulated conical structures.

Examples 6-9 and Comparative Examples 5-8

Figure 15A:
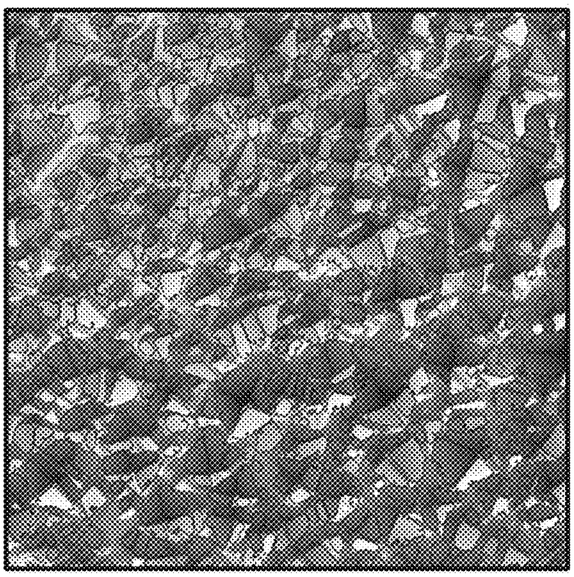
FIGS. 15A and 15B are composite AFM images of Samples 6A and 6B, respectively, that include the facet analysis described above.
Figure 15B:
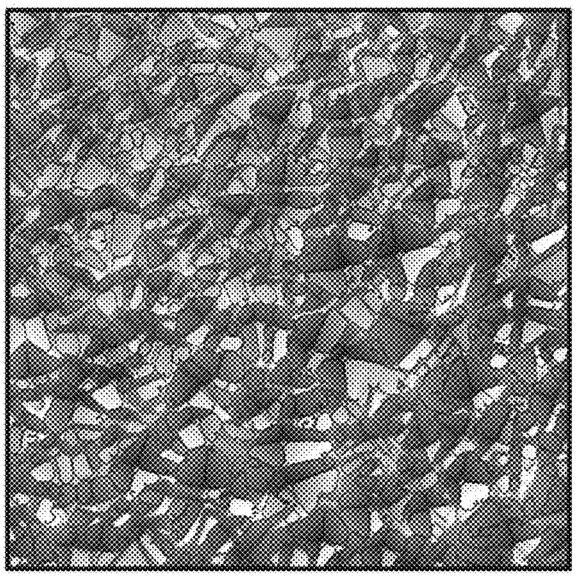
Figure 16A:
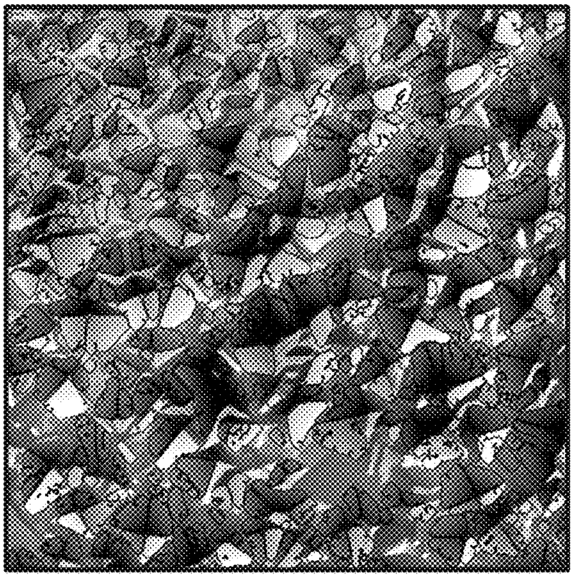
FIGS. 16A and 16B are composite AFM images of Samples 7A and 7B, respectively, that include the facet analysis described above.
Figure 16B:
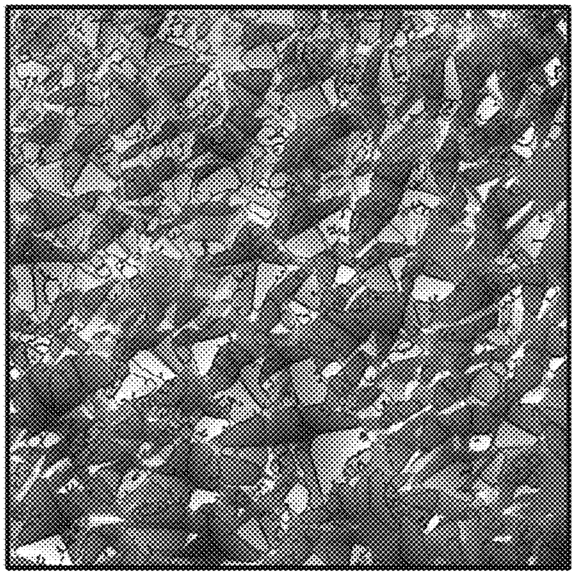
Figure 17A:
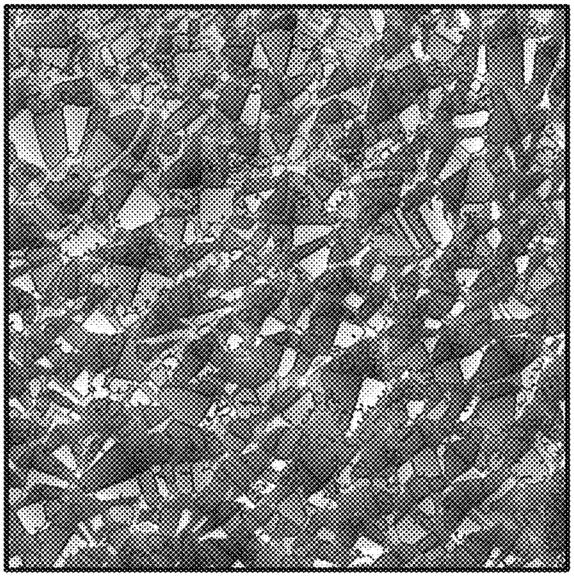
FIG. 17A is a composite AFM images of Sample 8 that includes the facet analysis described above.
Figure 17B:
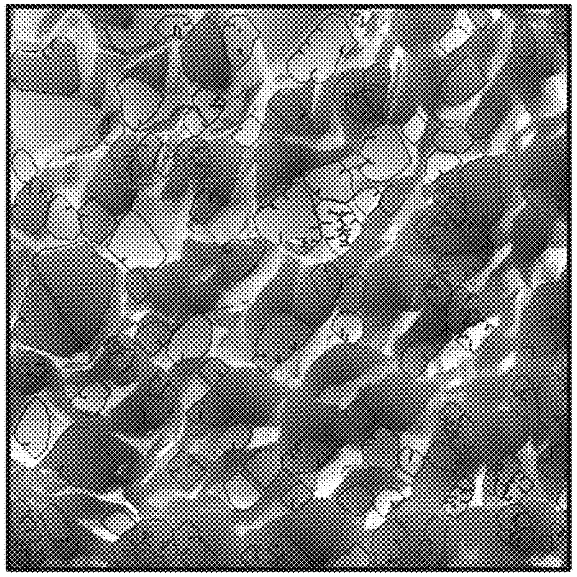
FIG. 17B is a composite AFM image of Sample 9 that includes the facet analysis described above.
Figure 18A:
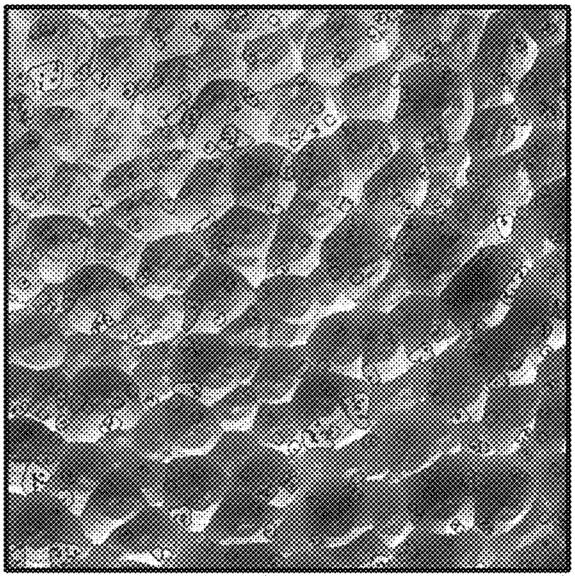
FIGS. 18A and 18B are composite AFM images of the optical film having round-peaked irregular prisms that include the facet analysis described above.
Figure 18B:
Figure 19:
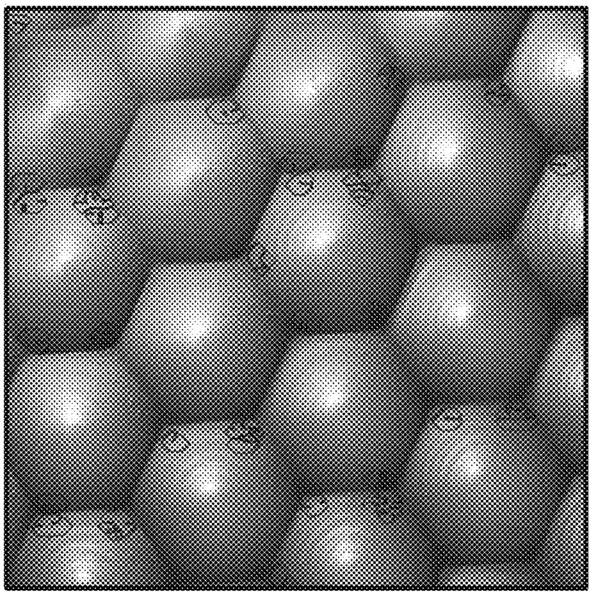
FIG. 19 is a composite AFM image of the optical film having a hexagonal packed array of cones that includes the facet analysis described above.
Figure 20:
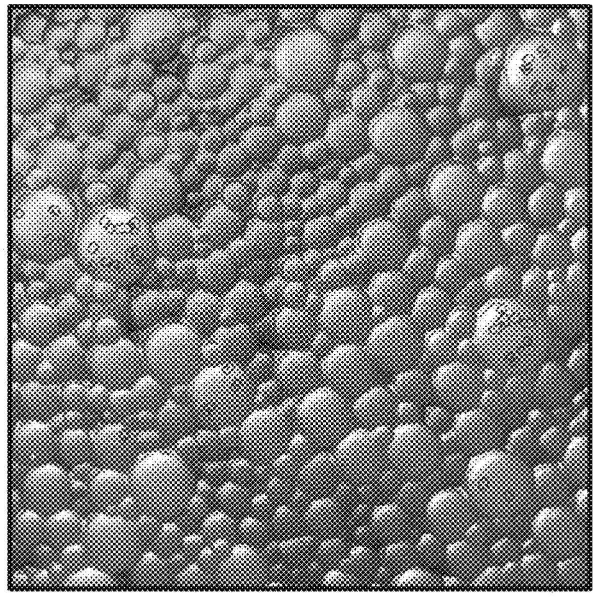
FIG. 20 is a composite AFM image of the optical film having a packed array of partial spheres that includes the facet analysis described above.
Figure 21:
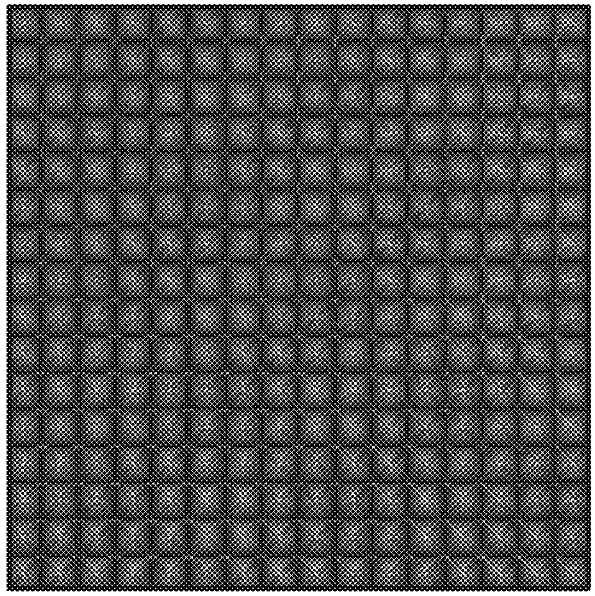
FIG. 21 is a composite AFM image of the optical film having an array of pyramidal prisms that includes the facet analysis described above.

FIGS. 15A and 15B are composite AFM images of Samples 6A and 6B, respectively, that include the facet analysis described above. FIGS. 16A and 16B are composite AFM images of Samples 7A and 7B, respectively, that include the facet analysis described above. FIG. 17A is a composite AFM images of Sample 8 that includes the facet analysis described above. FIG. 17B is a composite AFM image of Sample 9 that includes the facet analysis described above. FIGS. 18A and 18B are composite AFM images of the optical film having round-peaked irregular prisms that include the facet analysis described above. FIG. 19 is a composite AFM image of the optical film having a hexagonal packed array of cones that includes the facet analysis described above. FIG. 20 is a composite AFM image of the optical film having a packed array of partial spheres that includes the facet analysis described above. The outlines may represent the facet surfaces within curvature parameters. FIG. 21 is a composite AFM image of the optical film having an array of pyramidal prisms that includes the facet analysis described above. The outlines may represent the facet surfaces within curvature parameters.

Figure 22:
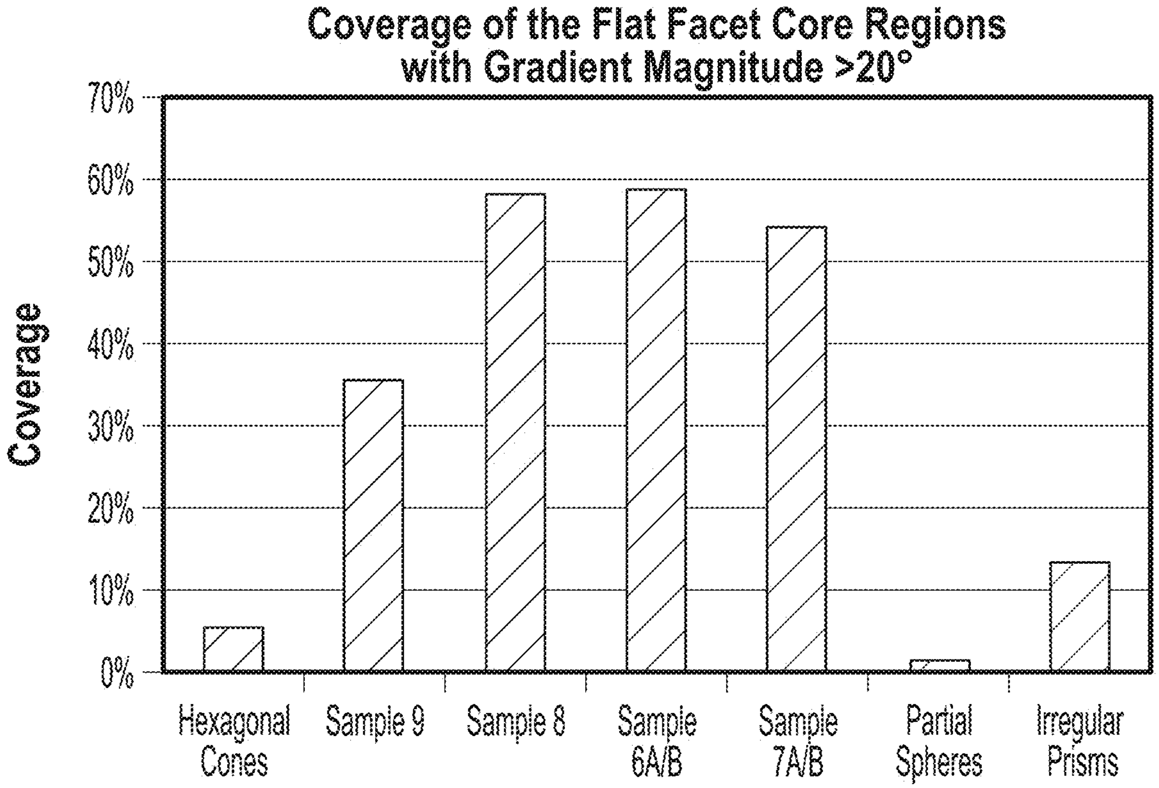
FIG. 22 is a graph of the coverage area of the flat facet core regions for the six optical film examples as a percent of total surface area. Samples 6-9 showed significantly higher surface area coverage than the irregular prism, partial sphere, and hexagonal cone optical films.

FIG. 22 is a graph of the coverage area of the flat facet core regions for the six optical film examples as a percent of total surface area. Samples 6-9 showed significantly higher surface area coverage than the irregular prism, partial sphere, and hexagonal cone optical films.

Figure 23A:
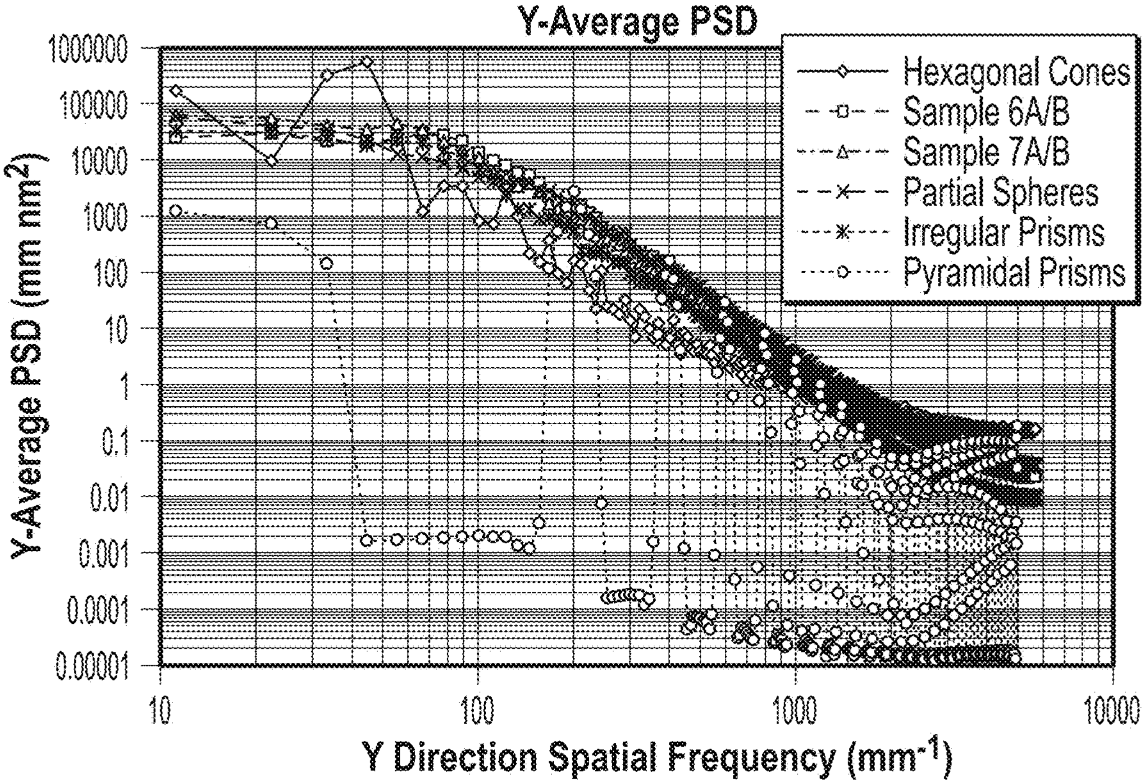
FIGS. 23A and 23B are graphs of power spectral density versus spatial frequency along two orthogonal in-plane directions (y and x, respectively).
Figure 23B:
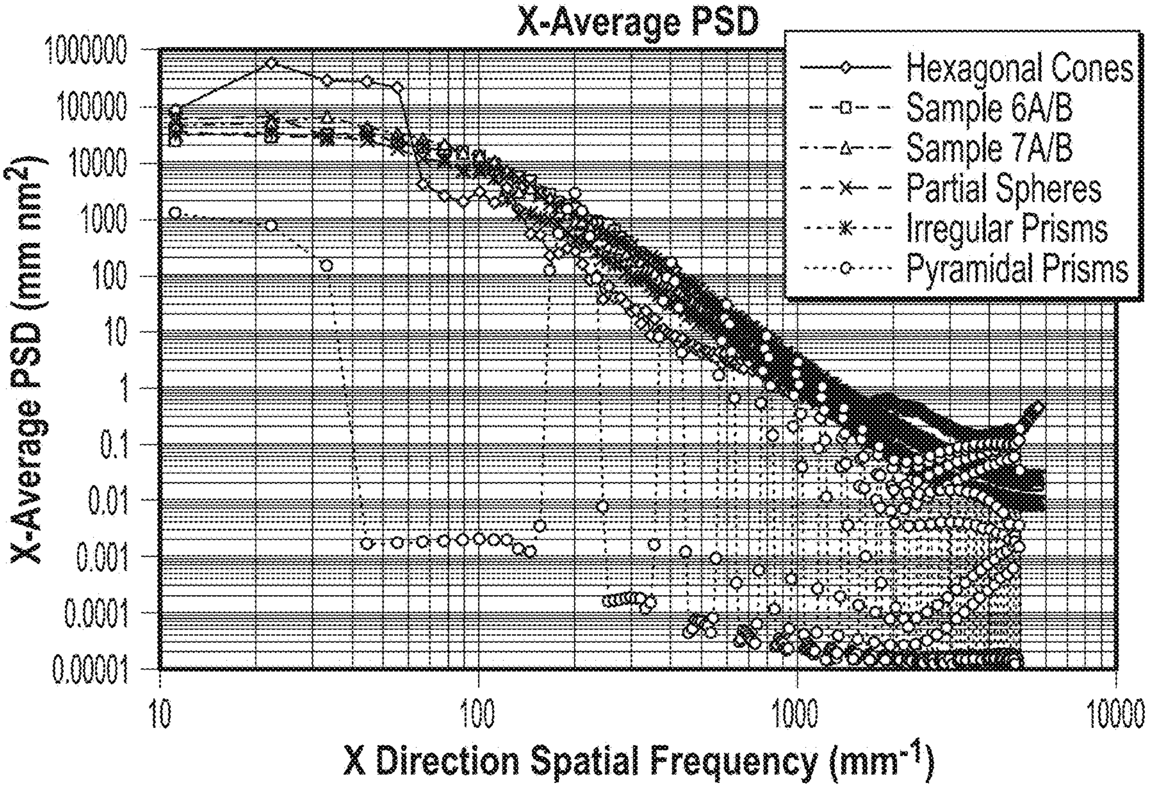

FIGS. 23A and 23B are graphs of power spectral density versus spatial frequency along two orthogonal in-plane directions (y and x, respectively). The topography of the films may be defined relative to a reference plane along which each optical film extends. Using the x,y plane as a reference plane, the topography of each structured surface may be described as a height relative to the reference plane for x and y components. FIGS. 23A and 23B represent a degree of spatial irregularity or randomness of prismatic structures on the surface of each optical film. As seen in FIGS. 23A and 23B, both x-average and y-average power spectral density steadily decrease with decreasing x-direction and y-direction, respectively, spatial frequency for Samples 6A/B and 7A/B of the present disclosure. In contrast, the optical film having pyramidal prisms shows high periodicity and patterning, as does the optical film having hexagonal packed array cones, as observed by the numerous and high peaks in power spectral density.

Figure 24A:
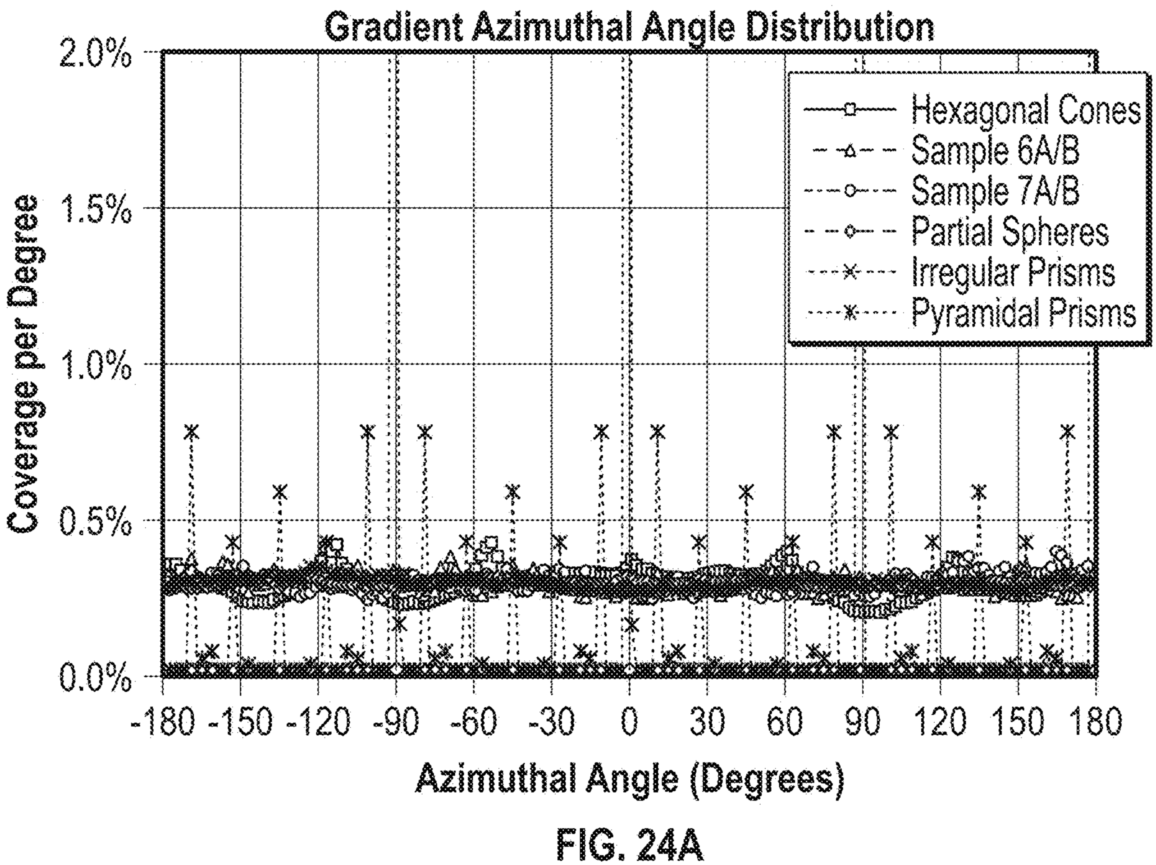
FIG. 24A is a graph of facet azimuthal angle distribution for the optical films, representing the surface area coverage at various azimuthal angles for the facet portions.
Figure 24B:
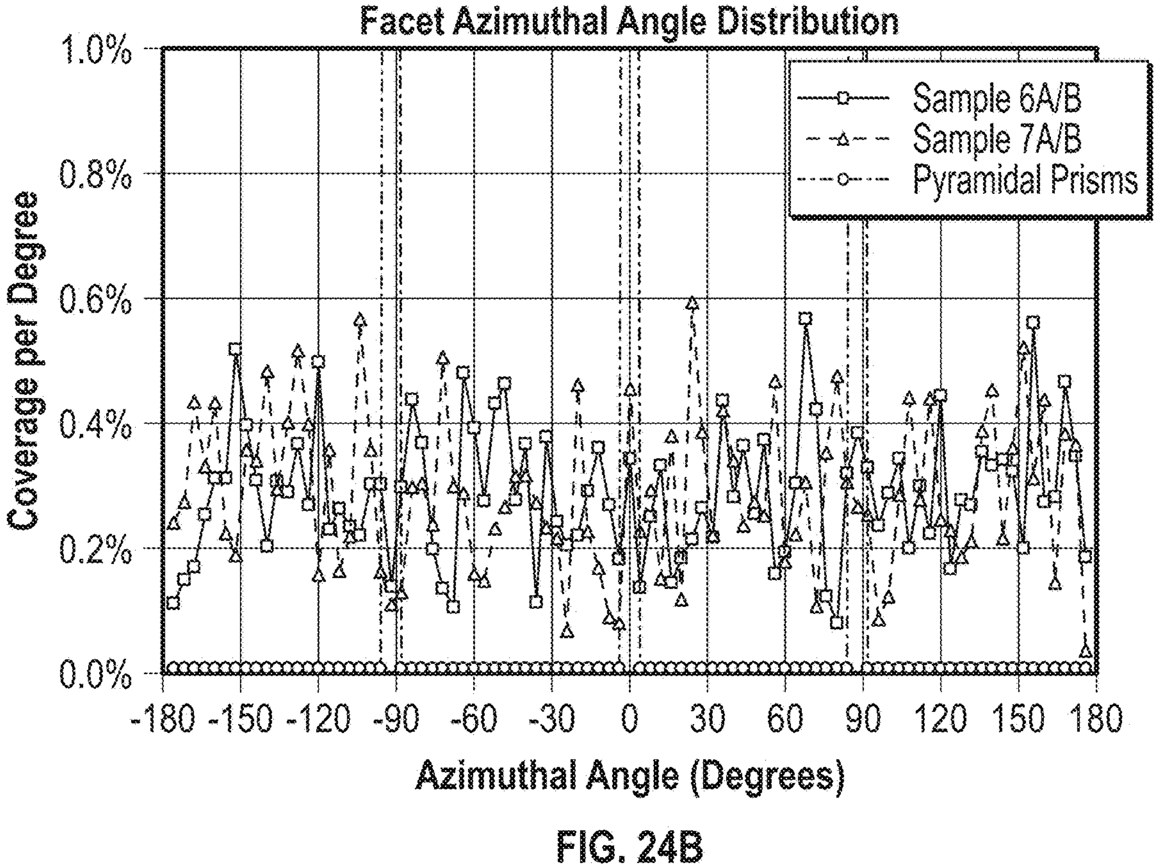
FIG. 24B is a graph of gradient azimuthal angle distribution for the flat faceted optical films, representing the surface area coverage at various azimuthal angles for the gradient portions.

FIG. 24A is a graph of facet azimuthal angle distribution for the optical films, representing the surface area coverage at various azimuthal angles for the facet portions. FIG. 24B is a graph of gradient azimuthal angle distribution for the flat faceted optical films, representing the surface area coverage at various azimuthal angles for the gradient portions. Each graph plots percent coverage of the film at periodic azimuthal angles. As seen in FIG. 24A, both the pyramidal prisms and hexagonal cones exhibit uneven azimuthal angle distribution for the facet portion, while the optical films of the present disclosure exhibit coverage within a narrower range. As seen in both FIGS. 24A and 24B, both optical films of the present disclosure exhibit substantially uniform surface azimuthal distribution of facets over a full azimuthal range, with small local variations in surface coverage.

Figure 25A:
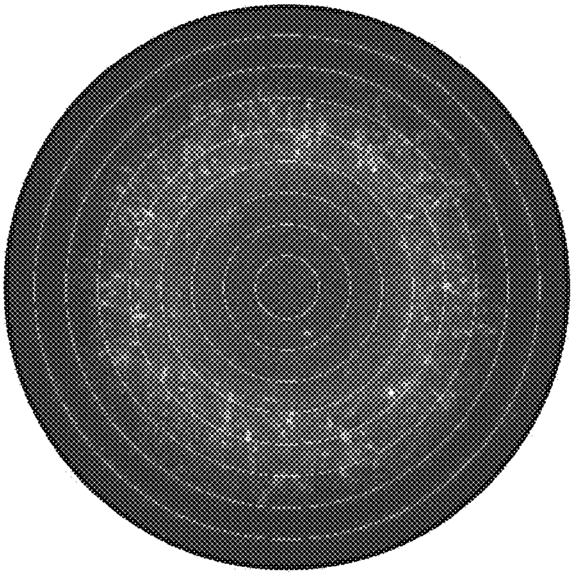
FIGS. 25A-B are two-dimensional distribution plots based on gradient/facet distribution from AFM data of the optical films of the present disclosure.
Figure 25B:
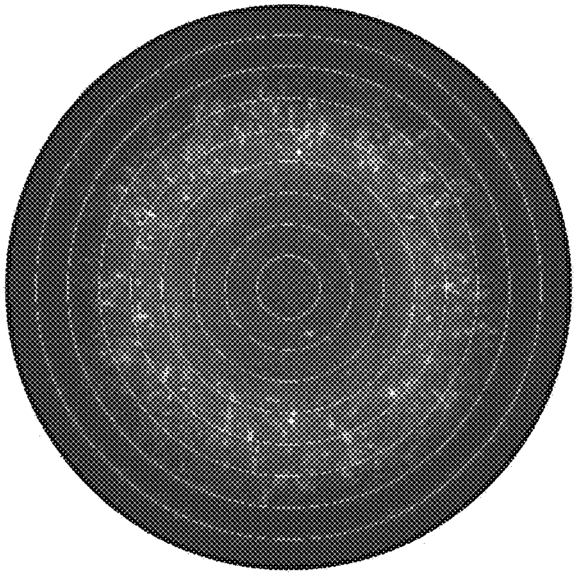
Figure 26A:
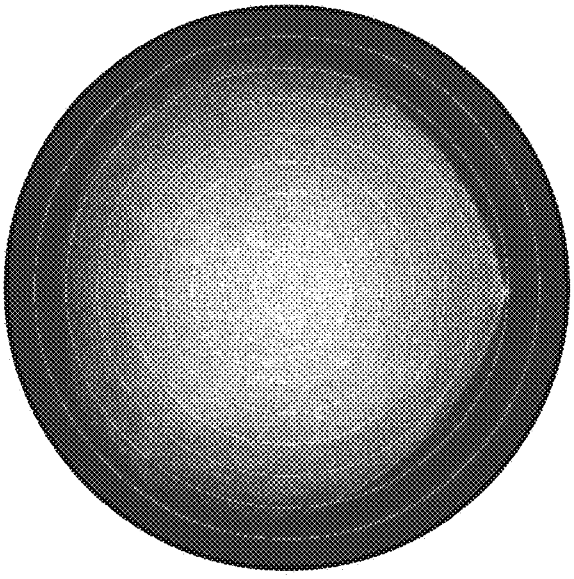
FIGS. 26A-D are two-dimensional distribution plots based on gradient/facet distribution from AFM data of the optical films having irregular prisms (26D), partial spheres (26A), hexagonal cones (26B), and pyramidal prisms (26C).
Figure 26B:
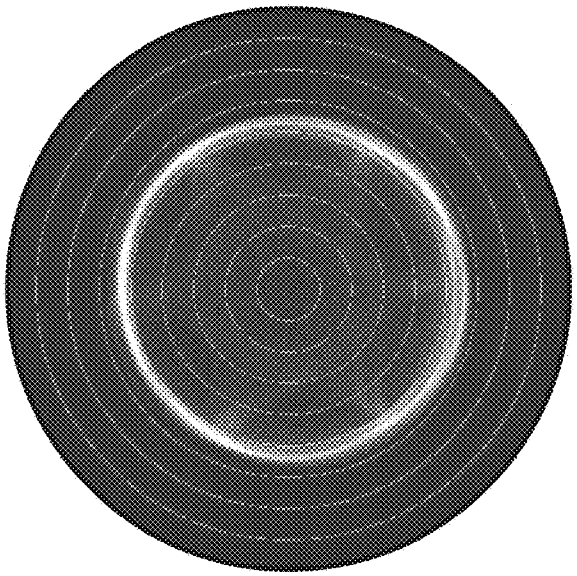
Figure 26C:
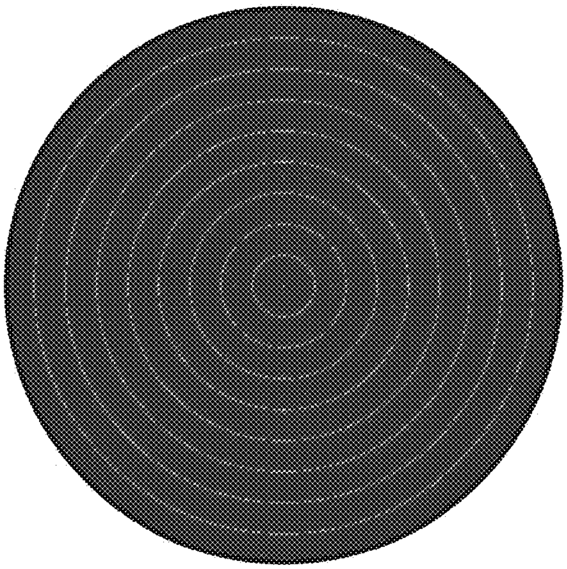
Figure 26D:
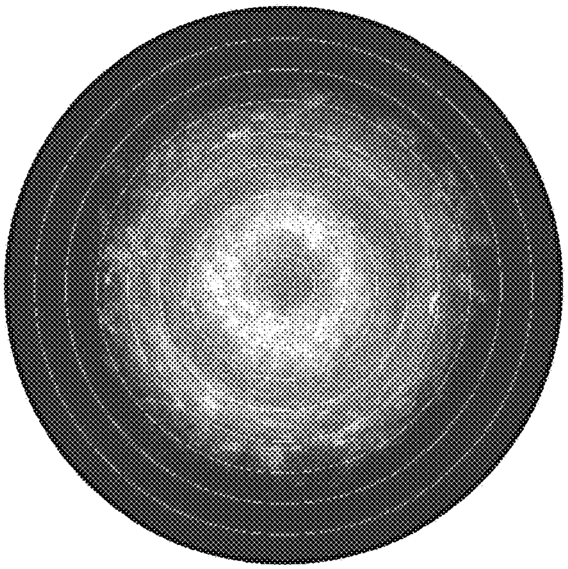

FIGS. 25A-B are two-dimensional distribution plots based on gradient/facet distribution from AFM data of the optical films of the present disclosure. FIGS. 25C and 26A-C are two-dimensional distribution plots based on gradient/facet distribution from AFM data of the optical films having irregular prisms (26D), partial spheres (26A), hexagonal cones (26B), and pyramidal prisms (26C). For each plot, the x-axis is the x-direction slope and the y-axis is the y-direction slope. The arc tangent is taken of the slops to give the slope angles in degrees. Each concentric ring represents 10 degrees. As seen in FIGS. 25A and 25B, the optical films of the present disclosure exhibit uniform surface azimuthal distribution and off-axis, concentrated surface polar distribution, similar to that seen in the conoscopic plots of Examples 1-3 above and correlating generally to azimuthal and polar transmission distribution. In contrast, FIG. 26D shows a surface polar distribution nearer to the on-axis polar angle. FIG. 26A shows a diffuse surface polar distribution with a high on-axis concentration. FIG. 26B shows a highly concentrated surface polar distribution. FIG. 26C shows a non-uniform surface azimuthal distribution.

Figure 27C:
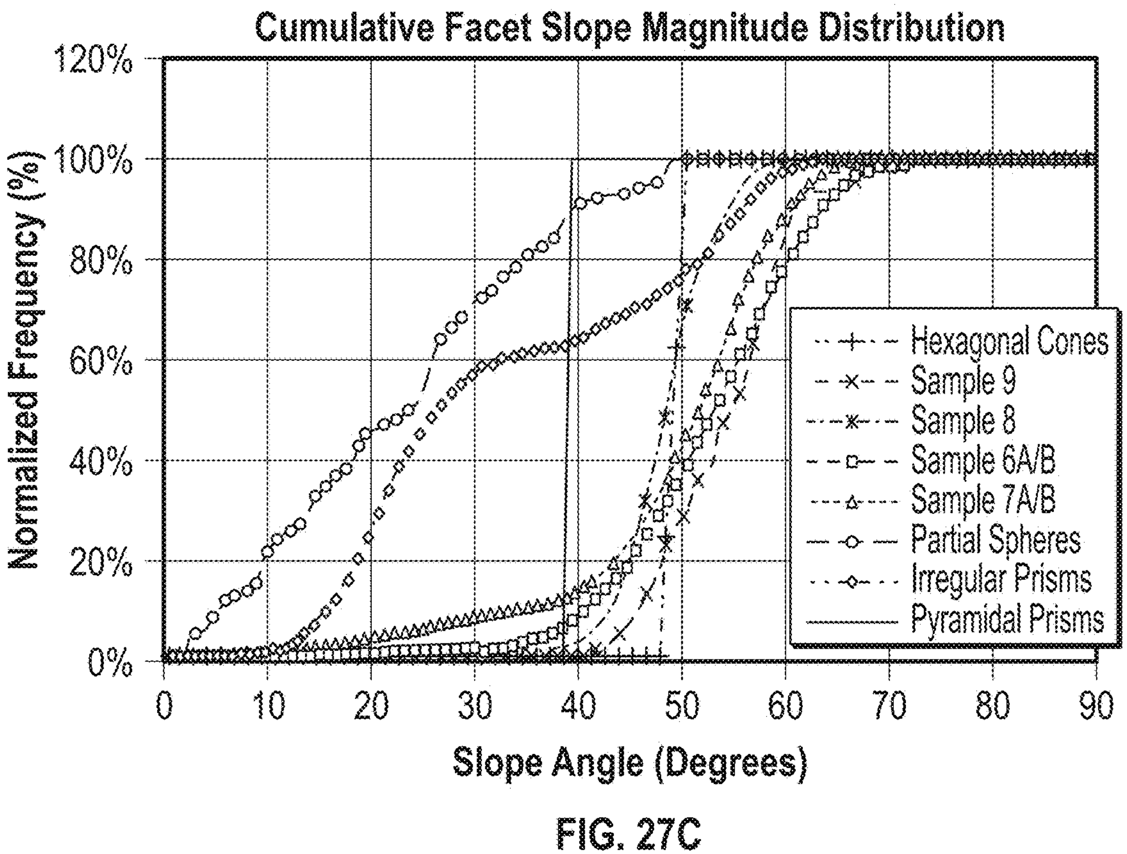
FIG. 27C is a cumulative facet slope magnitude distribution graph of the above optical films.

FIG. 27C is a cumulative facet slope magnitude distribution graph of the above optical films. Samples 6-9 have a more compact gradient magnitude distribution compared to the other optical films.

Figure 27D:
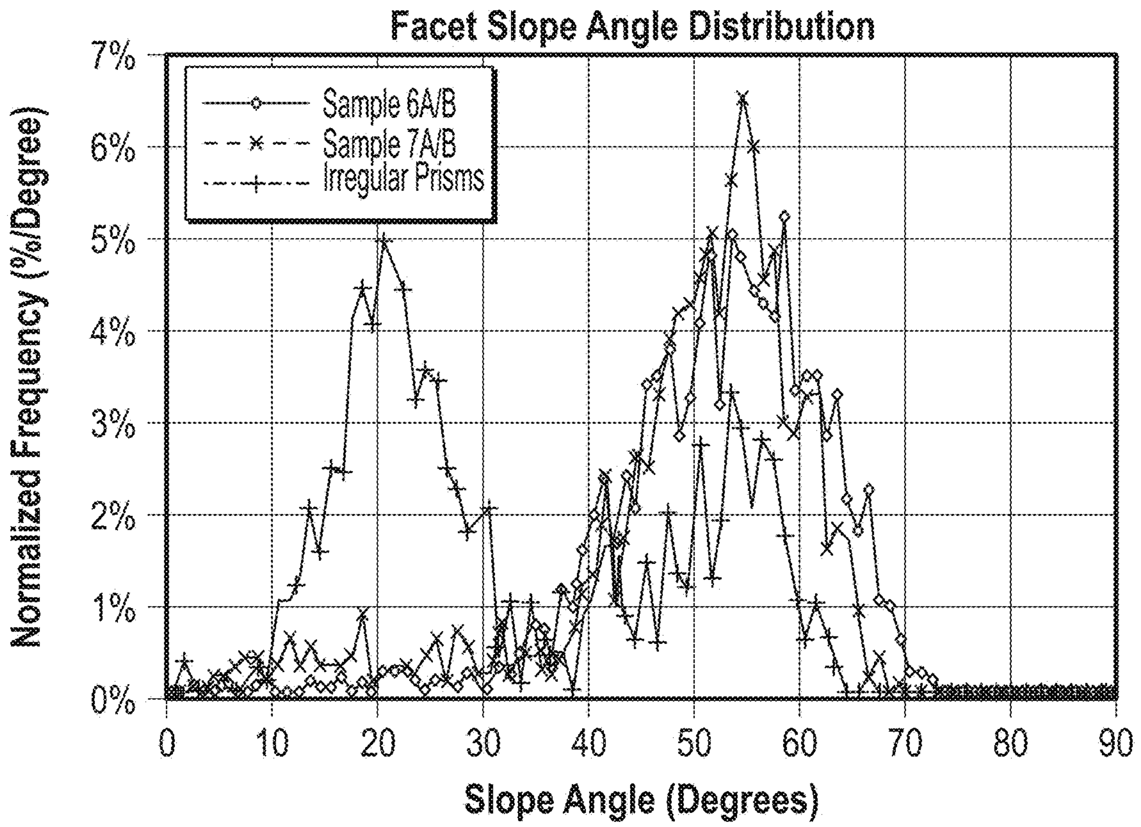
FIG. 27D is a facet slope angle distribution graph of a slope angle versus normalized frequency of the Sample 6, Sample 7, and irregular prisms.

FIG. 27D is a facet slope angle distribution graph of a slope angle versus normalized frequency of the Sample 6, Sample 7, and irregular prisms. The irregular prisms have a bimodal slope distribution, while Samples 6 and 7 have a pronounced peak distribution.

Figure 27E:
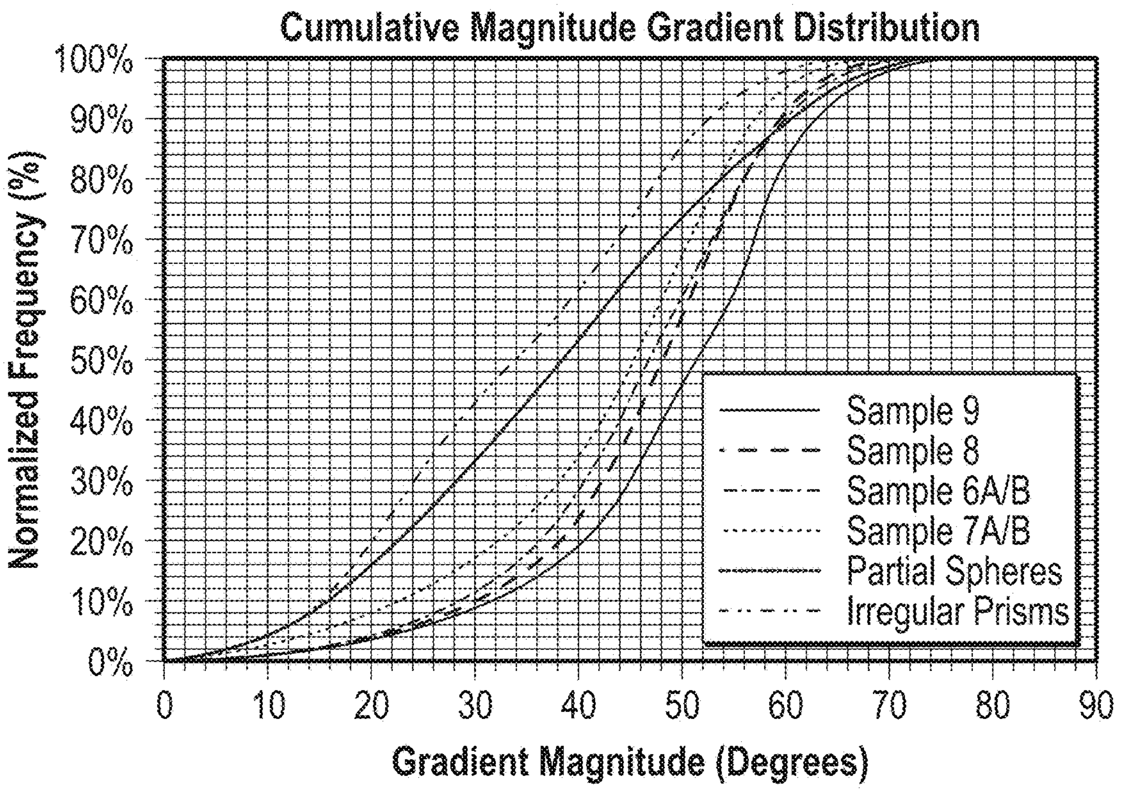
FIG. 27E is a gradient magnitude cumulative distribution graph for the above optical films.

FIG. 27E is a gradient magnitude cumulative distribution graph for the above optical films. Samples 6-9 have a higher gradient magnitude than partials spheres and irregular prisms.

Figure 27F:
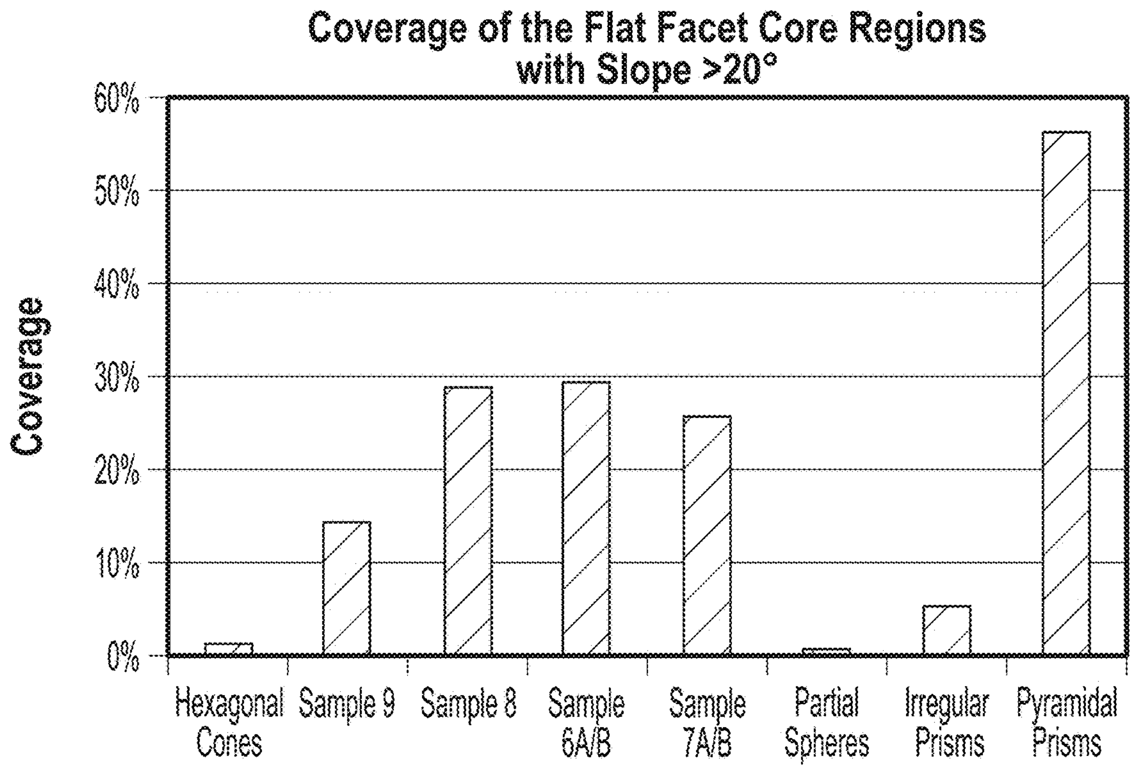
FIG. 27F is a chart of coverage of flat facet core regions with slope greater than 20 degrees.

FIG. 27F is a chart of coverage of flat facet core regions with slope greater than 20 degrees. Samples 6-9 have a significantly higher coverage of flat facets having slope greater than 20 degrees than hexagonal cones, partial spheres, and irregular prisms.

Figure 27G:
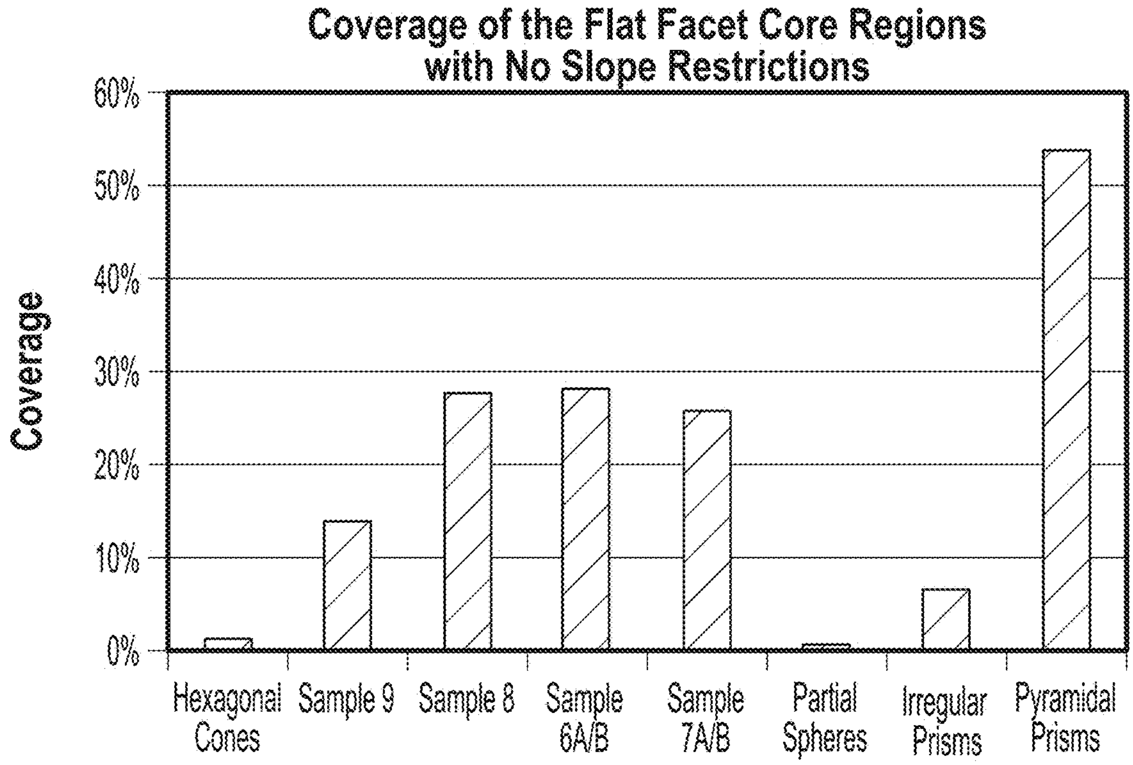
FIG. 27G is a chart of coverage of flat facet core regions without any slope restrictions.

FIG. 27G is a chart of coverage of flat facet core regions without any slope restrictions. Samples 6-9 have a significantly higher coverage of flat facets having slope greater than 20 degrees than hexagonal cones, partial spheres, and irregular prisms.

Figure 27H:
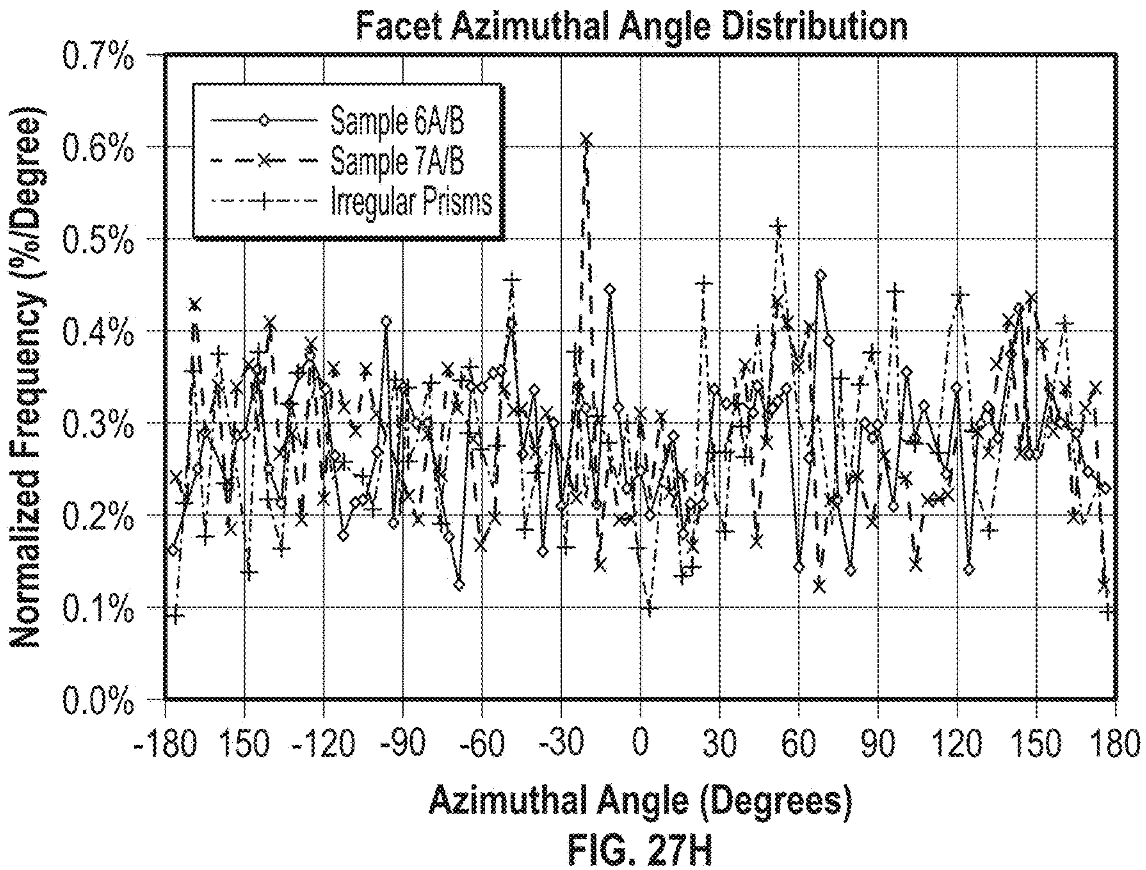
FIGS. 27H and 27I are graphs of facet azimuthal angle distribution and gradient azimuthal angle distribution.
Figure 27I:
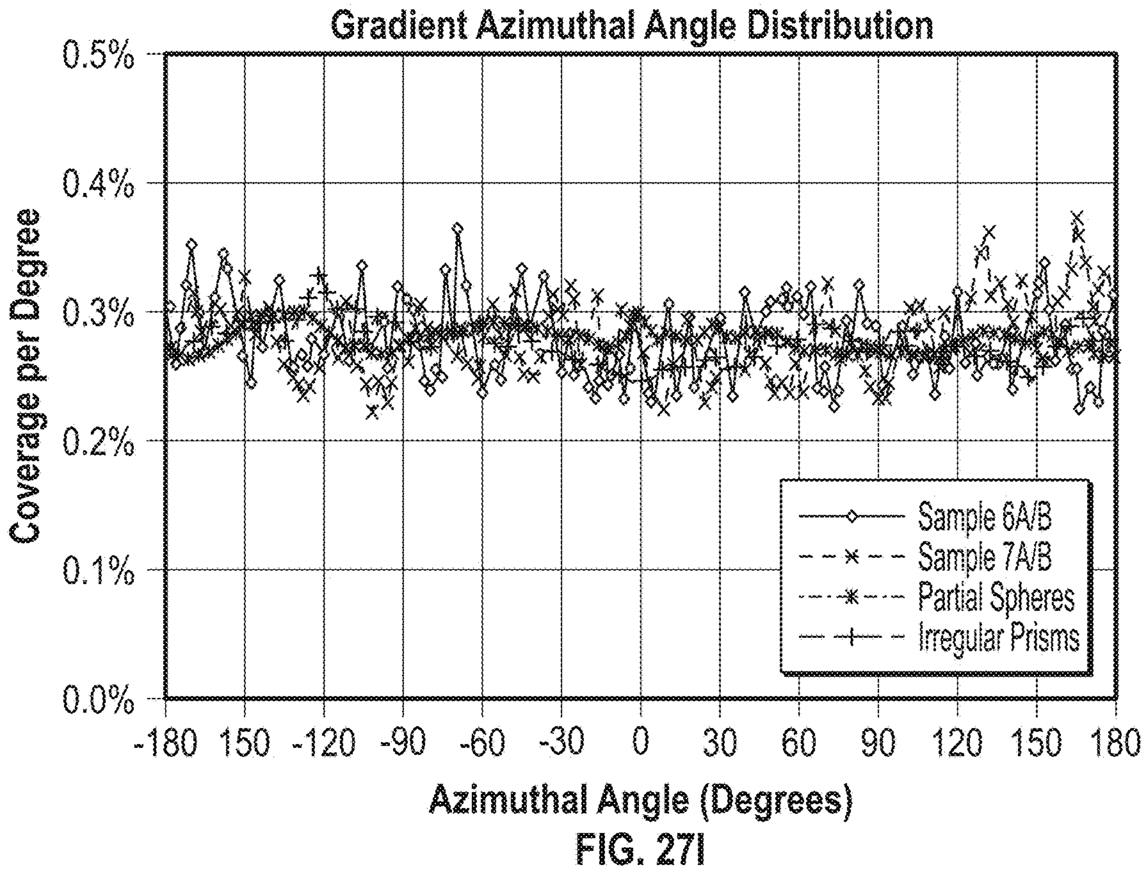

FIGS. 27H and 27I are graphs of facet azimuthal angle distribution and gradient azimuthal angle distribution. Samples 6 and 7 show substantially uniform azimuthal slope distribution throughout a full azimuthal range.

Figure 27J:
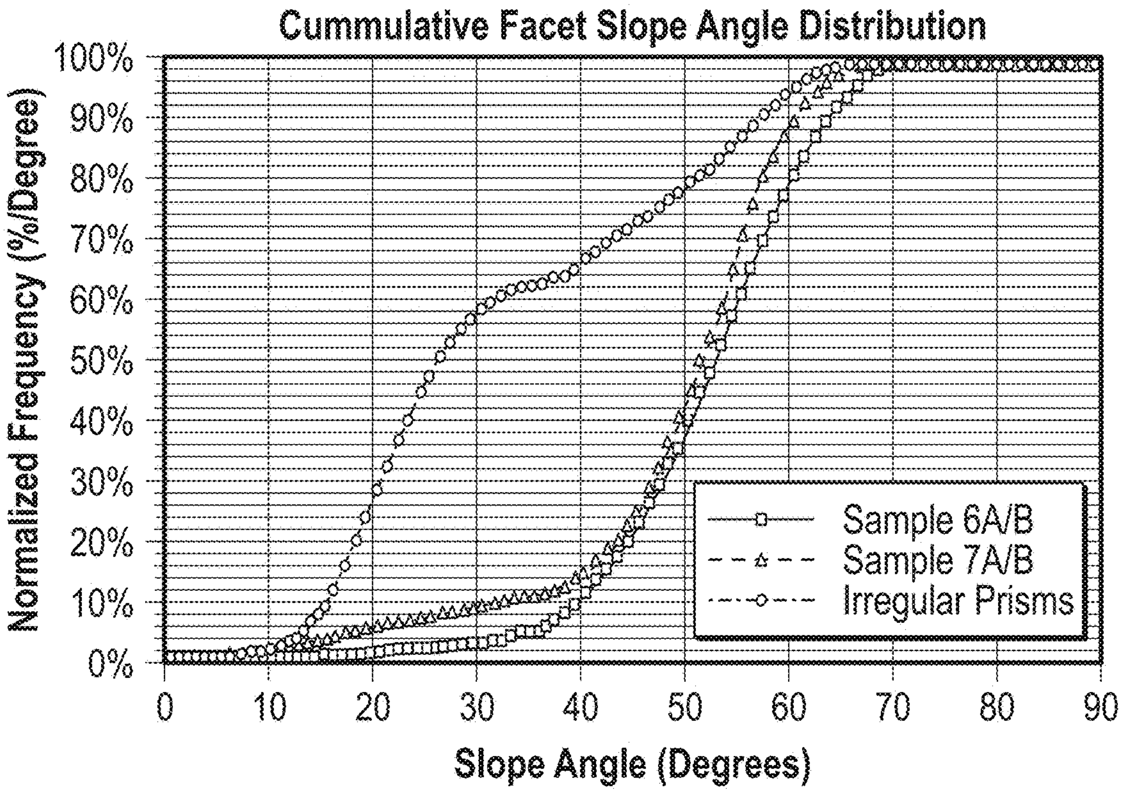
FIG. 27J is a cumulative facet slope angle distribution graph of the above optical films.

FIG. 27J is a cumulative facet slope angle distribution graph of the above optical films. Samples 6 and 7 have a much more compact slope angle (or gradient magnitude) distribution than irregular prisms.

Figure 27K:
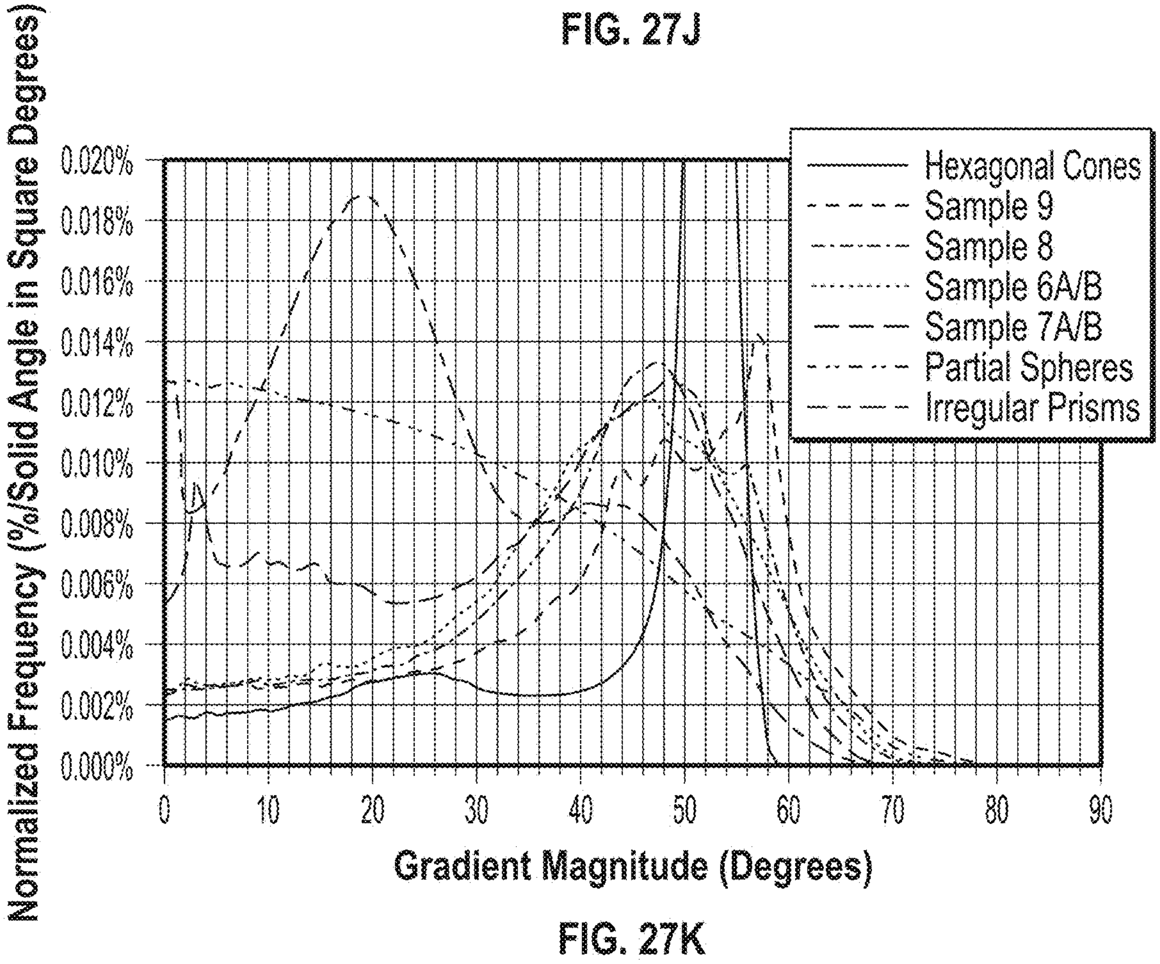
FIGS. 27K and L are graphs of gradient magnitude for a normalized frequency of % per solid angle in square degrees.
Figure 27L:
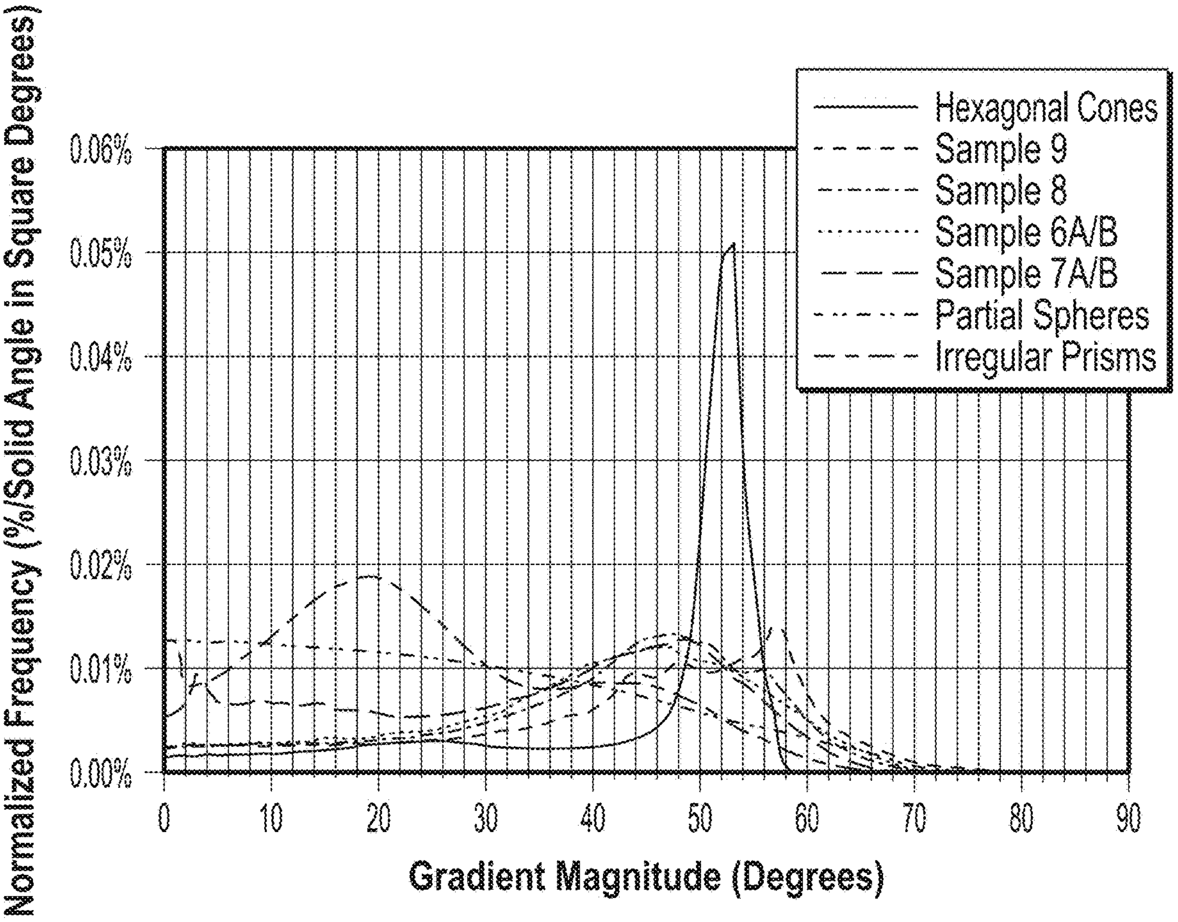
Figure 28A:
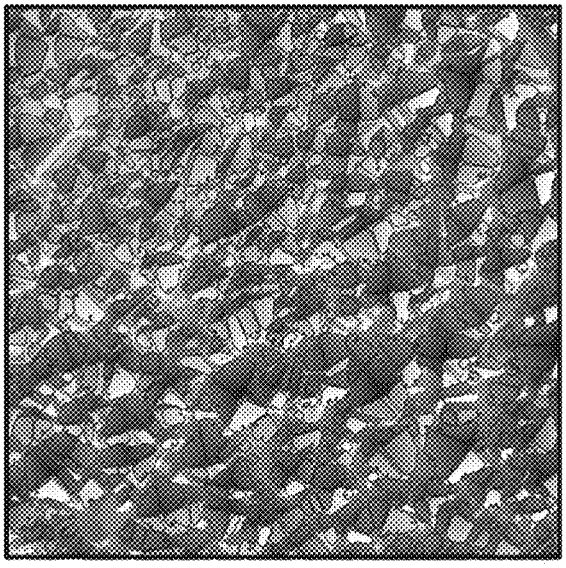
FIGS. 28A and 28B.
Figure 28B:
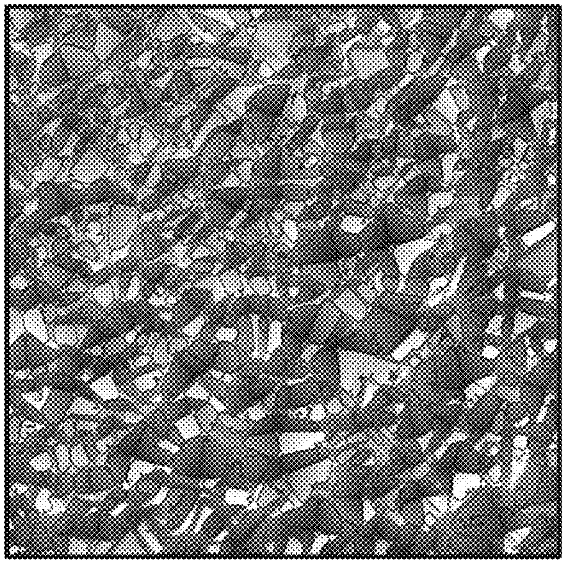
Figure 29A:
FIGS. 29A and 29B.
Figure 29B:
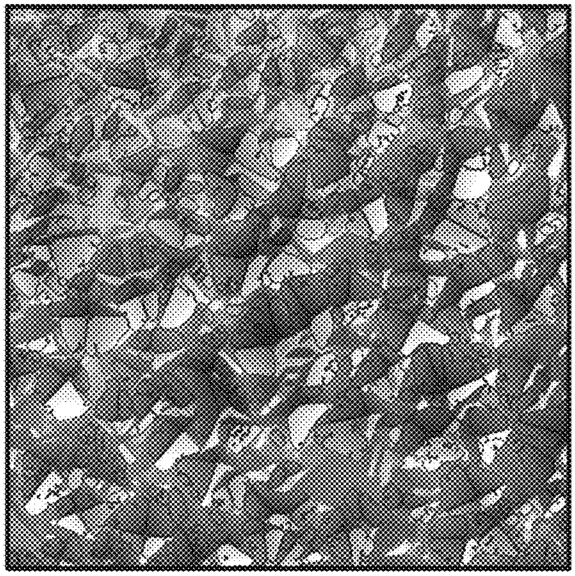
Figure 30:
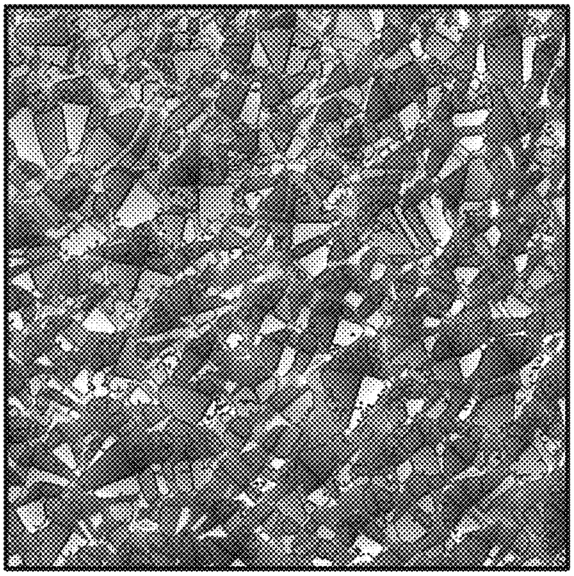
FIGS. 30-31.
Figure 31:
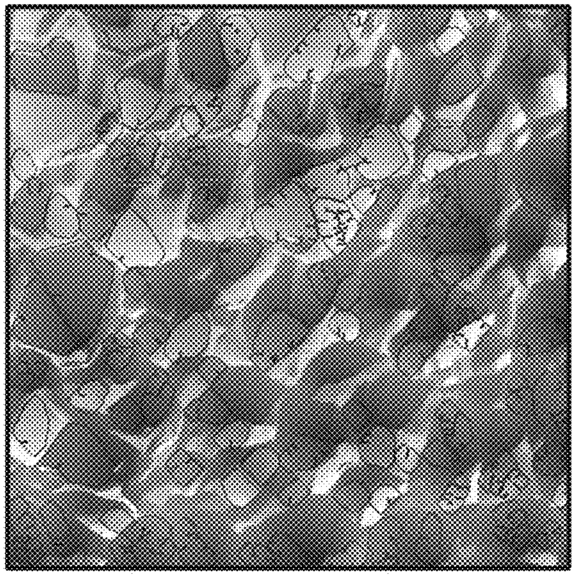
Figure 32A:
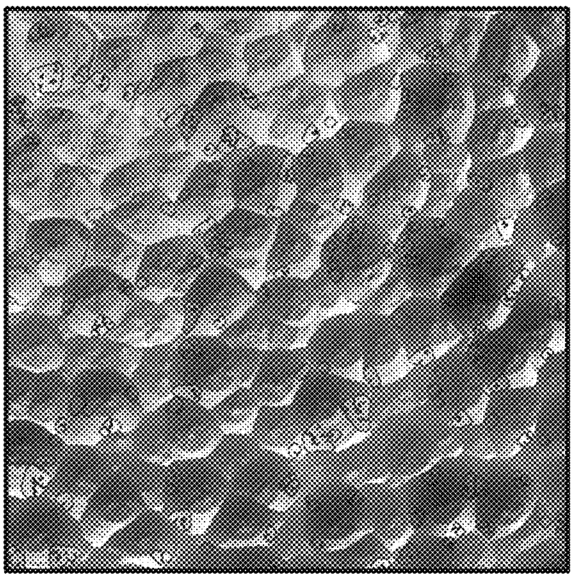
FIGS. 32A and 32B.
Figure 32B:
Figure 33:
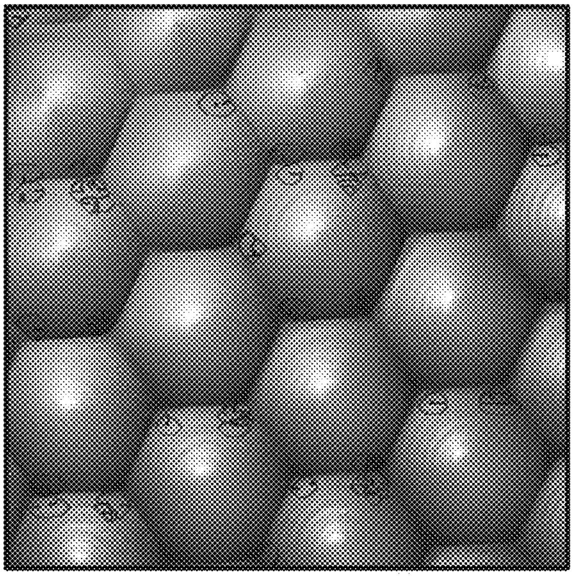
FIGS. 33-37 involve the same analysis as discussed for FIGS. 15-22 above, but with broader curvature constraints.
Figure 34:
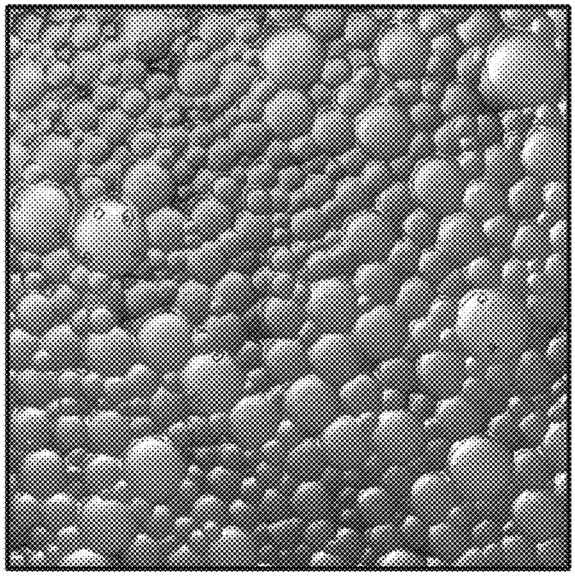
Figure 35:
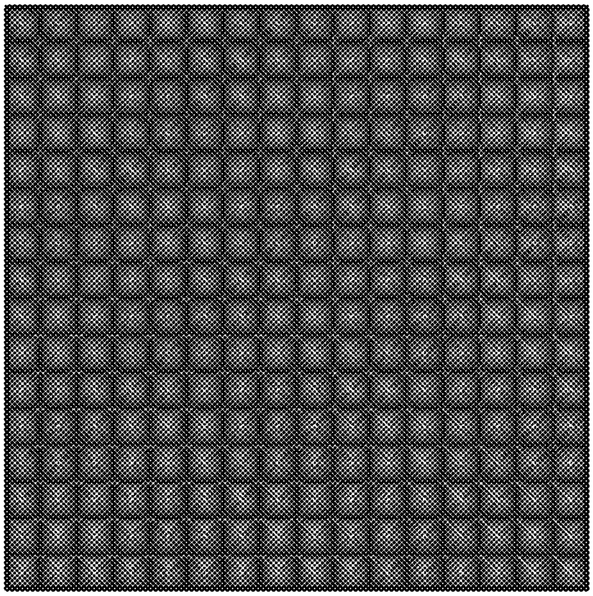

FIGS. 27K and L are graphs of gradient magnitude for a normalized frequency of % per solid angle in square degrees. Samples 6-9 have high surface coverage, as indicated by high % per solid angle in square degrees, for gradient magnitudes between 35 and 65.

FIGS. 28-36 involve the same analysis as discussed for FIGS. 15-22 above, but with broader curvature constraints.

Examples 10 and 11

FIG. 27A is a gradient magnitude cumulative distribution graph of a Sample 10 disclosed optical film, Sample 11 disclosed optical film, and an irregular prism optical film. In this example, the irregular prism optical may have a lower slope than either of Samples 10 and 11. FIG. 27B is a gradient magnitude distribution graph of Sample 10, Sample 11, and the irregular prism optical film. A peak gradient normalized frequency is at a lower gradient magnitude.

Various embodiments of the invention have been described. These and other embodiments are within the scope of the following claims.

The invention claimed is:

1. A microstructured surface comprising a plurality of substantially randomly arranged prismatic structures, each of the prismatic structures comprising a plurality of facets meeting at a peak, each of the facets comprising a substantially planar central portion defining a slope relative to a plane of the microstructured surface, the slopes defining a slope magnitude cumulative distribution, a rate of change of the slope magnitude cumulative distribution around 20 degrees being substantially less than around 60 degrees, wherein a rate of change in the slope magnitude distribution around 10 degrees is less than about 0.5% per degree, a rate of change in the slope magnitude distribution around 20 degrees is less than about 1% per degree, and a rate of change in the slope magnitude cumulative distribution for slopes less than about 30 degrees is less than about 2% per degree.

2. The microstructured surface of claim 1, wherein for a substantially collimated light incident along a normal direction, the microstructured surface has a first total optical transmittance for the collimated light incident from the peaks side of the microstructured surface, and a lower second total optical transmittance for the collimated light incident on the opposite side of the microstructured surface.

3. The microstructured surface of claim 2, wherein for a substantially collimated light incident from the opposite side of the microstructure surface along a direction oblique to the normal direction, the microstructured surface has a third total optical transmittance greater than the second total optical transmittance.

4. The microstructured surface of claim 1, wherein a percent surface per solid angle in units of square degrees having gradient magnitudes of about zero is from about 0.0005% to about 0.01%.

5. The microstructured surface of claim 1, wherein the substantially planar central portion of each of the facets is surrounded by a substantially curved peripheral portion.

* * * * *